United States Patent
Aston et al.

(10) Patent No.: US 11,103,925 B2
(45) Date of Patent: Aug. 31, 2021

(54) ADDITIVELY MANUFACTURED ANTENNA

(71) Applicant: The Boeing Company, Chicago, IL (US)

(72) Inventors: Richard W. Aston, Brea, CA (US); Martin W. Bieti, Tujunga, CA (US); Michael John Langmack, Huntington Beach, CA (US); Nicole M. Hastings, Redondo Beach, CA (US); Nicole Diane Schoenborn, Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/933,289

(22) Filed: Mar. 22, 2018

(65) Prior Publication Data

US 2019/0291186 A1   Sep. 26, 2019

(51) Int. Cl.
| | |
|---|---|
| *H01Q 13/02* | (2006.01) |
| *H01Q 1/12* | (2006.01) |
| *B22F 5/10* | (2006.01) |
| *B33Y 80/00* | (2015.01) |
| *H01Q 9/22* | (2006.01) |
| *H01Q 19/10* | (2006.01) |
| *H01Q 21/26* | (2006.01) |
| *H01Q 9/16* | (2006.01) |
| *B33Y 10/00* | (2015.01) |

(Continued)

(52) U.S. Cl.
CPC .............. *B22F 5/106* (2013.01); *B33Y 80/00* (2014.12); *H01Q 9/16* (2013.01); *H01Q 9/22* (2013.01); *H01Q 13/02* (2013.01); *H01Q 13/0283* (2013.01); *H01Q 19/108* (2013.01); *H01Q 21/26* (2013.01); *B22F 10/00* (2021.01); *B22F 2301/052* (2013.01); *B33Y 10/00* (2014.12); *H01Q 9/28* (2013.01)

(58) Field of Classification Search
CPC ............ H01Q 9/16; H01Q 9/22; H01Q 13/02; H01Q 13/0283; H01Q 19/108; H01Q 21/26; H01Q 9/28; H01Q 1/12; H01Q 1/36; H01Q 1/364; B22F 5/106; B33Y 80/00
USPC ........................................................ 343/786
See application file for complete search history.

(56) References Cited

U.S. PATENT DOCUMENTS

| | | | | |
|---|---|---|---|---|
| 2,478,913 A | * | 8/1949 | Goldberg ............... | H01Q 19/13 343/818 |
| 3,597,710 A | | 8/1971 | Levy | |

(Continued)

FOREIGN PATENT DOCUMENTS

| | | |
|---|---|---|
| CN | 102361116 A | 2/2012 |
| KR | 20190044527 A | 4/2019 |
| WO | 2012076994 A1 | 6/2012 |

OTHER PUBLICATIONS

Huang, Guan-Long et al., "3-D Metal-Direct-Printed Wideband and High-Efficiency Waveguide-Fed Antenna Array", The Institute of Electrical and Electronics Engineers, Inc. (IEEE) Conference Proceedings, May 1, 2015, p. 1.

(Continued)

*Primary Examiner* — Hoang V Nguyen
(74) *Attorney, Agent, or Firm* — Kolisch Hartwell, P.C.

(57) ABSTRACT

An additively manufactured antenna device is disclosed, including a base portion and a body portion. The body portion is attached to the base portion and includes a lattice stiffening structure configured to eliminate secondary printing support.

22 Claims, 11 Drawing Sheets

(51) Int. Cl.
  *H01Q 9/28* (2006.01)
  *B22F 10/00* (2021.01)

(56) References Cited

U.S. PATENT DOCUMENTS

| | | | |
|---|---|---|---|
| 4,668,956 | A | 5/1987 | Mahnad |
| 5,182,849 | A | 2/1993 | Marco |
| 6,323,819 | B1* | 11/2001 | Ergene .................... H01P 1/161 |
| | | | 343/786 |
| 9,496,621 | B2* | 11/2016 | Meschini ............... B64G 1/222 |
| 9,608,333 | B1* | 3/2017 | Toledo ................. H01Q 15/161 |
| 9,742,069 | B1 | 8/2017 | Hollenbeck et al. |
| 10,355,359 | B1* | 7/2019 | Butscher .................. H01Q 7/00 |
| 10,751,988 | B1 | 8/2020 | Snyder et al. |
| 2010/0065192 | A1* | 3/2010 | Wilson .................... G06F 3/042 |
| | | | 156/180 |
| 2011/0279339 | A1 | 11/2011 | Johnston |
| 2012/0044119 | A1* | 2/2012 | Libonati .................. H01Q 9/28 |
| | | | 343/807 |
| 2016/0067740 | A1* | 3/2016 | Voris ......................... B05C 5/02 |
| | | | 427/402 |
| 2016/0107380 | A1* | 4/2016 | Smoot ................... B29C 64/124 |
| | | | 264/401 |
| 2016/0167312 | A1* | 6/2016 | Feinberg ................. A61L 27/24 |
| | | | 264/239 |
| 2017/0036783 | A1 | 2/2017 | Snyder |
| 2017/0062925 | A1 | 3/2017 | Sanchez |
| 2017/0252804 | A1 | 9/2017 | Hanni et al. |
| 2017/0361534 | A1* | 12/2017 | Fernandez-Nieves ....................... |
| | | | B33Y 10/00 |
| 2018/0021140 | A1* | 1/2018 | Angelini ................. A61L 27/52 |
| | | | 623/23.72 |
| 2018/0083350 | A1 | 3/2018 | Lam et al. |
| 2018/0087443 | A1* | 3/2018 | Adriany .................... F01P 11/04 |
| 2018/0184550 | A1* | 6/2018 | Jenkins .................. H05K 1/181 |
| 2018/0229863 | A1* | 8/2018 | Veto ........................ B64G 1/402 |
| 2018/0258382 | A1* | 9/2018 | Keselowsky ......... C12N 5/0062 |
| 2018/0311733 | A1* | 11/2018 | Zafar ......................... B22F 3/18 |
| 2020/0112107 | A1* | 4/2020 | Taptic .................... H01Q 15/24 |
| 2020/0373642 | A1 | 11/2020 | Aston et al. |
| 2020/0373657 | A1 | 11/2020 | Aston et al. |

OTHER PUBLICATIONS

Kaddour, Abdul Sattar et al., "3D Printed Compact Dual-Polarized Wideband Antenna", 2017 11th European Conference on Antennas and Propagation (EUCAP), EURAAP Mar. 19, 2017, pp. 3441-3443.

European Patent Office, Extended European Search Report regarding European Patent Application No. 19164587.8, dated Aug. 6, 2019, 10 pages.

Saucourt, Jeremy et al., "Design of 3D printed plastic modular filters", 2016 46th European Microwave Conference (EUMC), European Microwave Association, Oct. 4, 2016, pp. 369-372.

Peverini, Oscar A. et al., "Selective Laser Melting Manufacturing of Microwave Waveguide Devices", Proceedings of the IEEE, IEEE, New York, US, vol. 105, No. 4, Apr. 1, 2017, pp. 620-631.

Talom, F. Tchoffo et al., "Additive manufacturing form RF microwave devices: Design, performances and treatments improvement evaluations", 2017 International Conference on Electromagnetics in Advanced Applications (ICEAA), IEEE, Sep. 11, 2017, pp. 1473-1476.

Booth, Paul A. et al., "Realizing advanced waveguide bandpass filters using additive manufacturing", IET Microwaves, Antennas & Propagation, The Institution of Engineering and Technology, United Kingdom, vol. 11, No. 14, Nov. 19, 2017, pp. 1943-1948.

Peverini, Oscar A. et al., "Additive manufacturing of Ku/K-band waveguide filters: a comparative analysis among selective-lithography" IET Microwaves, Antennas & Propagation, vol. 11, No. 14, Nov. 19, 2017, pp. 1936-1942.

Salak, Milan et al., "W-Band Waveguide Bandpass Filters Fabricated by Micro Laser Sintering", IEEE Transactions on Circuits and Systems II: Express Briefs, IEEE, US, vol. 66, No. 1, Jan. 1, 2019, pp. 61-65.

European Patent Office, Extended European Search Report regarding European Patent Application No. 20164010.9, dated Sep. 18, 2020, 12 pages.

European Patent Office, Extended European Search Report regarding European Patent Application No. 20170572.0 dated Oct. 28, 2020, 7 pages.

Wang et al., "A Wideband Millimeter-Wave Circularly Polarized Antenna With 3-D Printed Polarizer", IEEE Transactions on Antennas and Propagation, vol. 65, No. 3, March 1, 20217, pp. 1038-1046.

Hindle, Pat, "Antenna Technologies for the Future", Microwave Journal, Jan. 15, 2018, Retrieved from the Internet: URL: https://www.microwavejournal.com/articles/print/29572-antenna-technologies-for-the-future, retrieved on Jul. 27, 2020, 9 pages.

European Patent Office, Examination Report regarding European Patent Application No. 19164587.8, dated Aug. 5, 2020, 8 pages.

European Patent Office, Examination Report regarding European Patent Application No. 19164587.8, dated Mar. 5, 2021, 7 pages.

U.S. Patent and Trademark Office, Non-Final Office Action regarding U.S. Appl. No. 16/422,939 dated Mar. 15, 2021, 25 pages.

U.S. Patent and Trademark Office, Non-Final Office Action regarding U.S. Appl. No. 16/422,949, dated Apr. 9, 2021, 31 pages.

\* cited by examiner

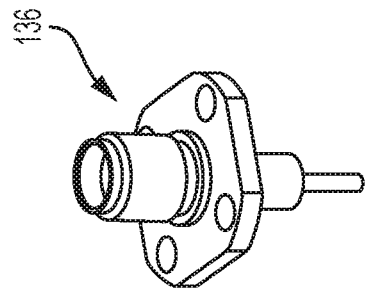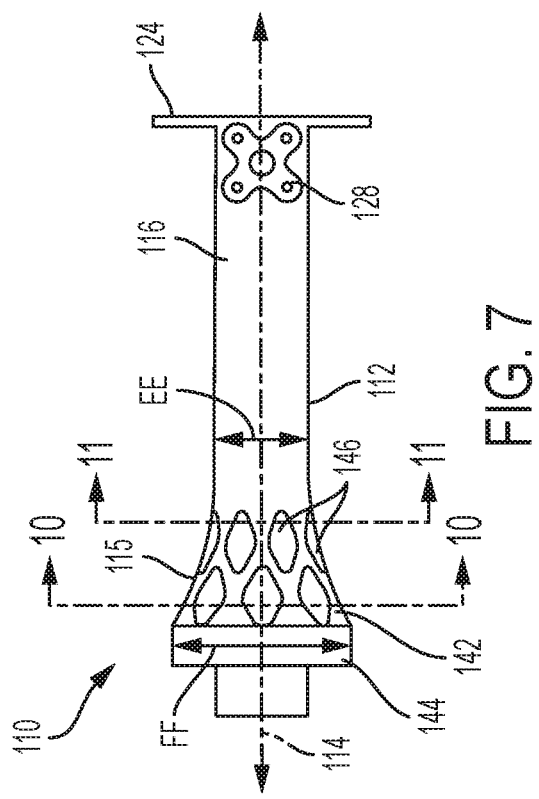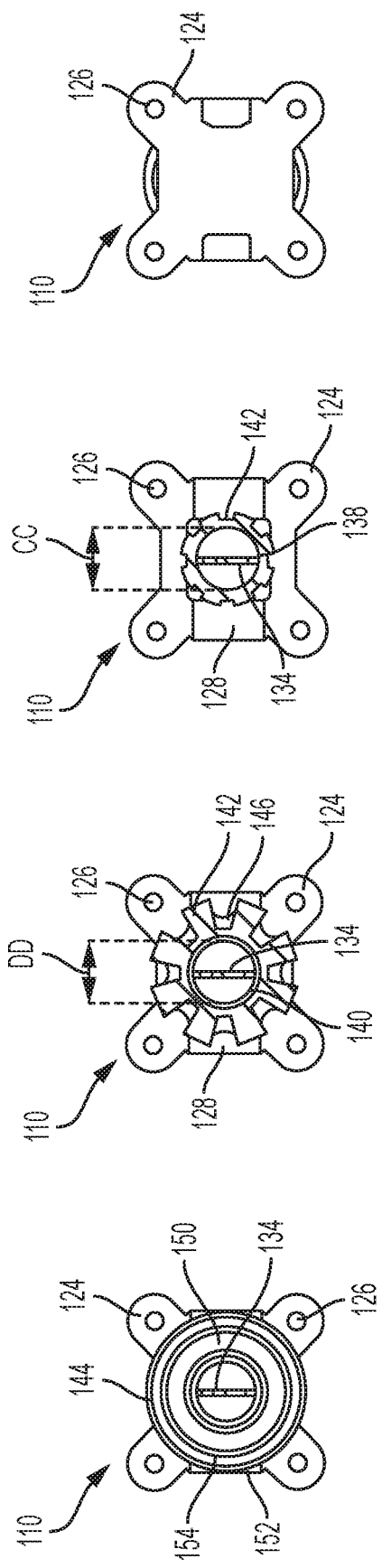
FIG. 8
FIG. 12
FIG. 11
FIG. 10
FIG. 9
FIG. 7

ADDITIVELY MANUFACTURED ANTENNA

FIELD

This disclosure relates to systems and methods for radio signal communication. More specifically, the disclosed embodiments relate to antennas and antenna components.

INTRODUCTION

Antennas are a key element of radio communications technology, for transmitting and/or receiving radio signals. The conductive material of an antenna serves as an interface between electric currents in a communicator circuit and radiated electromagnetic waves. Geometry and material of the antenna determine properties such as impedance, directionality, and bandwidth. Preferable properties depend on the intended location and application of the antenna, which may vary widely. For example, consumer FM radios may use a monopole omnidirectional antenna appropriate to receiving signals from any direction, whereas GPS satellites may use a highly directional waveguide for earth directed transmission. For many applications, complex geometry must be executed with high precision to produce an effective antenna. Such antennas are conventionally manufactured by hand assembly of multiple individually machined parts, a slow and expensive process.

Additive Manufacturing (AM) is quickly gaining popularity in many industries as a method of rapid production at relatively low cost. AM, sometimes known as 3D printing, can be used to create a solid object from a 3D model by building the object incrementally. AM typically applies a raw material that is then selectively joined or fused to create the desired object. The raw material is typically applied in layers, where the thickness of the individual layers can depend upon the particular techniques used.

Often the raw material is in the form of granules or powder, applied as a layer and then selectively fused by a heat source. In many cases, the upper surface of a bed of such material is fused, and the growing workpiece is then lowered slightly into the bed itself. A fresh layer of raw material is then applied to the bed, and the next layer is fused onto the previous one. The granular raw material may include for example thermoplastic polymer, metal powder, metal alloy powder, or ceramic powder, which may be fused using a computer-controlled heat source, such as a scanning laser or scanning electron beam. Exemplary methods include selective laser melting (SLM), direct metal laser sintering (DMLS), selective laser sintering (SLS), fused deposition modelling (FDM), and electron beam melting (EBM) among others.

Conventional part designs used for machining or other subtractive manufacturing may be inefficient or even unworkable for AM. Depending on the process and material used, unsupported features may collapse, delicate features may be rendered with insufficient clarity, and/or warping and cracking may occur. New designs maintaining functionality of conventional parts while enabling efficient use of AM methods are needed.

SUMMARY

The present disclosure provides systems, apparatuses, and methods relating to antenna devices and components. In some embodiments, an additively manufactured antenna device may include a base portion and a body portion. The body portion may be attached to the base portion and may include a lattice stiffening structure configured to eliminate secondary printing support.

In some embodiments, an antenna component may comprise an elongate hollow body portion of laser sintered alloy. The body portion may be configured to direct radio frequency signals and may include a lattice stiffening structure on an outer circumferential side. The lattice stiffening structure may be configured to avoid secondary printing support requirements.

A method of manufacturing an antenna may comprise printing a tubular structure configured to send or receive radio frequency signals, the tubular structure having an outer circumferential side portion supported by a lattice array.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 7 is a side view of the antenna of FIG. 5.

FIG. 8 is an isometric view of an illustrative coaxial adaptor, as described herein.

FIG. 9 is a top view of the antenna of FIG. 5.

FIG. 10 is a cross-sectional view of the antenna of FIG. 5, along line 10-10 in FIG. 7.

FIG. 11 is a cross-sectional view of the antenna of FIG. 5, along line 11-11 in FIG. 7.

FIG. 12 is a bottom view of the antenna of FIG. 5.

DESCRIPTION

Various aspects and examples of an antenna component having a circumferential lattice stiffening structure, as well as related methods of manufacture are described below and illustrated in the associated drawings. Unless otherwise specified, an antenna component and/or its various subcomponents may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Overview

In general, an antenna device may include an additively manufactured structure comprising a conductive material. An antenna device may also be referred to as an antenna component. The antenna component may be configured to facilitate sending and/or receiving radio signals, and may function as part of a conventional antenna such as a command horn, cup dipole, or waveguide antenna. The antenna component may additionally or alternatively function as an antenna without additional components.

Figure 1:
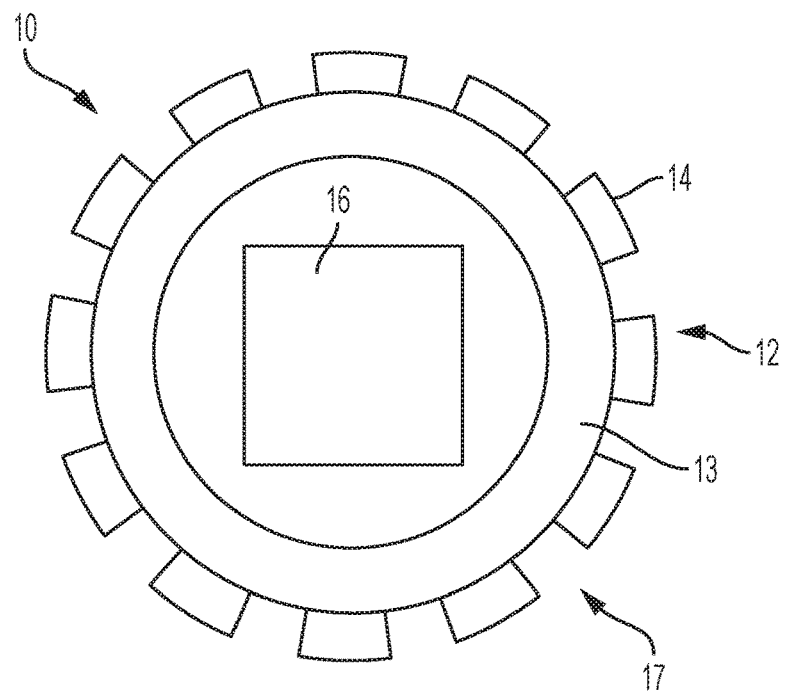
FIG. 1 is a schematic diagram of an illustrative antenna device in accordance with aspects of the present disclosure.

FIG. 1 is a schematic diagram of an antenna component indicated at 10, having a body portion 12 with a wall 13 and a lattice stiffening structure 14. The body portion may be tubular, elongate, and/or hollow. The lattice stiffening structure may be disposed on an outer circumferential side 17 of body portion 12, or may be described as circumferentially or peripherally surrounding some section of wall 13. In FIG. 1, body portion 12 is depicted as circular in cross-section, but may include any appropriate cross-sectional shape. The body portion may be configured to form a channel for sending or receiving radio frequency signals, and/or may be configured to direct radio frequency signals.

Antenna component 10 further includes an internal structure 16. The internal structure may have any geometry configured to facilitate transmission and/or reception of radio frequency electromagnetic waves. The structure may be configured for a selected polarization, resonant frequency band, radiation pattern, and/or any functional antenna properties. Wall 13 may also have an inner geometry configured for a selected polarization, resonant frequency band, radiation pattern, and/or any functional antenna properties.

Internal structure 16 may be formed on an inner surface of wall 13, and/or may be formed on other portions of antenna component 10 such as a base portion or a top portion. Examples of internal structure 16 include, but are not limited to, a septum, an iris, a dipole, a tuning screw, a post filter, and/or any combination thereof.

Antenna component 10 includes a conductive material, which may be a laser sintered metal. In some examples, the component may include aluminum, copper, titanium, and/or an alloy thereof. The component may include multiple materials, or may be produced from a single material. Conductivity, elasticity, density, and temperature sensitivity, along with other factors, may be considered in selecting a material or combination of materials for antenna component 10. Appropriate or desirable materials may depend on an intended application of the antenna component, and a selected additive manufacturing method.

Figure 2:
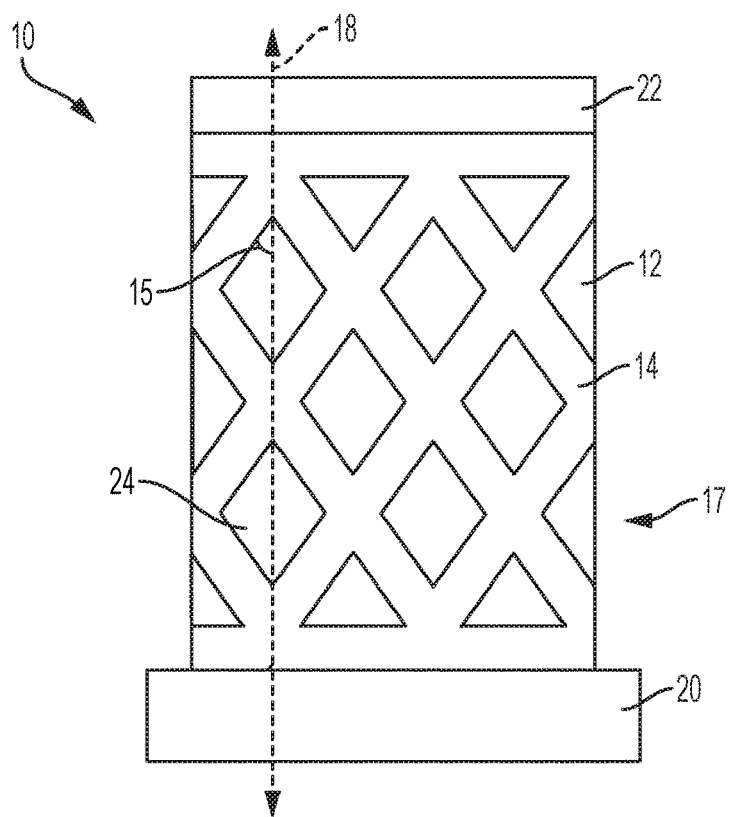
FIG. 2 is a schematic diagram of an illustrative lattice stiffening structure in accordance with aspects of the present disclosure.

Antenna component 10 has a manufacturing orientation defined by a vertical axis 18, which may coincide with an elongate axis of body portion 12. The vertical axis is depicted in FIG. 2. The component may comprise a plurality of layers, each layer being generally perpendicular to vertical axis 18. Each layer may be thin and planar, and fused to or otherwise cohesive with adjacent layers.

Variation from one layer to an adjacent layer may be limited. That is, dimensions of antenna component 10 may change gradually along vertical axis 18. The antenna component may include no abrupt overhangs, where an abrupt overhang may be described as any downward-facing surface forming an angle of greater than approximately 45 degrees or greater than approximately 50 degrees with vertical axis 18. All features of antenna component 10 may therefore be printed without need for secondary supports.

In some examples, antenna component 10 may be post-processed from an additively manufactured blank. Abrupt overhangs or other features inappropriate to additive manufacture may be machined. In such examples, the additively manufactured blank may include no abrupt overhangs and may be printed without use of secondary supports.

Thickness of any structure of antenna component 10 may be bounded. In other words, the thickness may have an upper and/or a lower limit. Each layer of the antenna component may have limited area for any structure. The limit may be absolute or relative. For example, wall 13 of body portion 12 may be limited to a thickness of less than 60 thousandths of an inch ("mils"), where 1 mil=0.001", or the wall 13 may be limited to 6% of a diameter of the body portion. Such restriction may prevent cracking or tearing of printed material due to stresses introduced in the manufacturing process and/or in subsequent cooling or other temperature fluctuation.

For another example, wall 13 may be restricted to a thickness of more than 20 mils. Such restriction may help to produce a desired print resolution and features of sufficient strength to maintain geometric integrity through the additive manufacturing process.

Lattice stiffening structure 14 is depicted schematically in FIG. 2, and includes a plurality of diamond shaped openings 24. The plurality may also be described as an array of diamond shaped openings. Each side of each diamond shaped opening may form an angle 15 with vertical axis 18. Angle 15 may be less than approximately 45 degrees or less than approximately 50 degrees. The lattice stiffening structure may also be described as a first plurality of parallel linear structures and a second plurality of parallel linear structures intersecting the first plurality. Each linear structure may form an angle with vertical axis 18 of less than approximately 45 degrees or less than approximately 50 degrees.

Lattice stiffening structure 14 may be configured to increase a structural strength of body portion 12 and/or wall 13. The antenna component may thereby have a positive structural margin and/or meet a selected stiffness requirement. Lattice stiffening structure 14 may be configured to maintain a circular shape, or any shape, of body portion 12 through additive manufacture of antenna component 10. The structure may facilitate a stable geometry of antenna component 10, and reduce warping and/or thermal distortion during a manufacturing process. The antenna component may thereby have low geometric profile deviations from a Computer Aided Design (CAD) nominal specification. Lattice stiffening structure 14 may be configured to support features of antenna component 10, to avoid a need for secondary support in additive manufacture of the antenna component.

Antenna component 10 further includes a base portion 20 and a top portion 22. In some examples, lattice stiffening structure 14 may support top portion 22, which may be larger than body portion 12 in some lateral dimension. The lattice structure may gradually increase in that lateral dimension along vertical axis 18, such that the top portion does not constitute an abrupt overhang as discussed above. In other words, the lattice structure may flare outward toward the top portion at an average angle of less than approximately 50 degrees. The body portion may also be described as flaring outward toward the top portion.

Base portion 20 or other portions of antenna component 10 may be configured for connection to an electronic circuit. For example, the antenna component may include apertures appropriate for attaching coaxial adaptors. The antenna component may also be configured for connection to other antenna components, such as a reflector dish or dipole. In some examples, antenna component may be designed to have an equivalent functionality as an existing antenna design and may be configured to connect to a generally matching electrical system as the existing antenna design.

Antenna component 10 may include additional portions, configured to facilitate communication of radio signals and/or to facilitate efficient additive manufacture. In some examples, antenna component 10 may include fewer components or one structure may fulfill the functions of two or more portions described herein. For example, internal structure 16 and top portion 22 may be a single structure, or the same structure.

Antenna component 10 may be partially or entirely unitary. In other words, wall 13, lattice stiffening structure 14, internal structure 16, base portion 20, top portion 22, and/or any other portions of the antenna component may comprise a single structure. The antenna component may be additively manufactured in one process, without need for assembly of separate parts. The antenna component may also be manufactured without secondary supports that require removal after manufacture.

Antenna component 10 may have improved reliability, as a result of unitary construction. Failure modes related to connection or interaction of parts may be eliminated. For example, the antenna component may not include bolts that may loosen under vibration, shims that shift under load, or tuning screws that alter tuning during transportation. Generally, potential for operational complications may be reduced for an antenna comprising fewer components.

Antenna component 10 may have a geometry configured to be repeatable. In other words, the geometry of the antenna component may be such that when multiple copies of the component are manufactured, each copy measures within a desired tolerance of the original design. In some examples the desired tolerance may be 1 mil, may be 10 mil, or may be any appropriate size. Manufactured copies may also be true to shape. For example, an aperture designed to be circular may be consistently printed as circular and not elliptical.

Examples, Components, and Alternatives

The following sections describe selected aspects of exemplary antenna devices and antenna components as well as related systems and/or methods. The examples in these sections are intended for illustration and should not be interpreted as limiting the entire scope of the present disclosure. Each section may include one or more distinct embodiments or examples, and/or contextual or related information, function, and/or structure.

A. Illustrative Command Horn Antenna

As shown in FIGS. 5-12, this section describes an additively manufactured command horn antenna, generally indicated at 110. Antenna 110 is an example of additively manufactured antenna component 10, as described above. The command horn antenna may also be described as a command pipe antenna, or a waveguide antenna.

Figure 4:
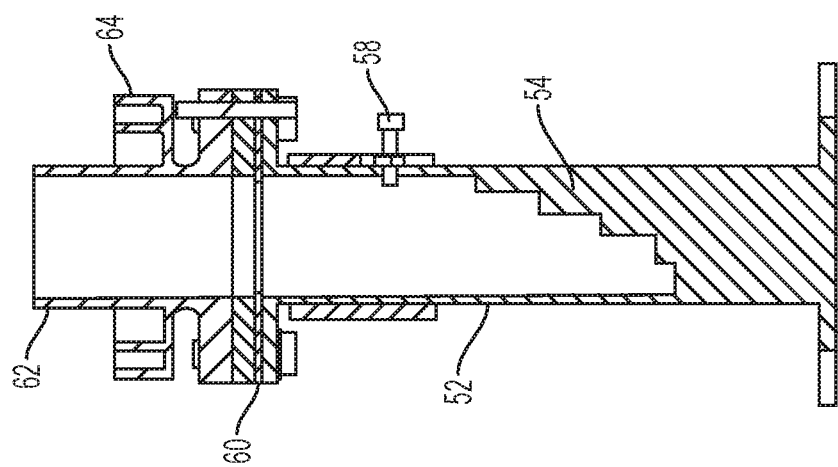
FIG. 4 is a cross-sectional view of the antenna of FIG. 3, along line 4-4.
Figure 3:
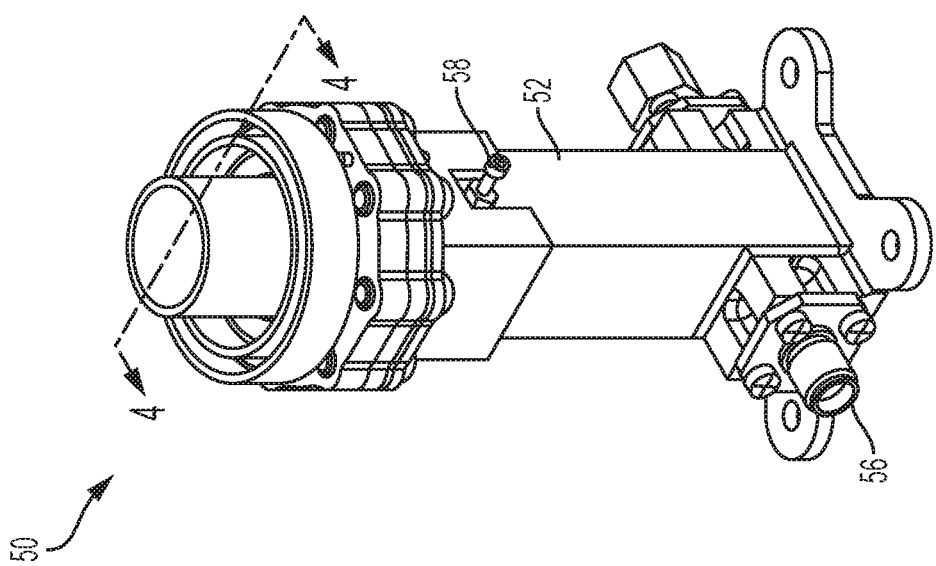
FIG. 3 is an isometric view of an illustrative conventionally manufactured command horn antenna as described herein.

FIGS. 3-4 show a design for a conventional, subtractively manufactured command horn antenna, generally indicated at 50. Conventional antenna 50 comprises a plurality of separately machined components, each screwed, bonded, or otherwise fixed together. Antenna 50 includes a hollow rectangular polarizer 52, with an internal stepped septum 54 configured for a circular polarization of the antenna. The septum, shown in cross-section in FIG. 4, is a thin structure that is not possible to machine as part of polarizer 52 and is positioned and bonded in the polarizer during assembly of antenna 50.

At a bottom end of polarizer 52 are coaxial connectors 56, fastened by screws to the polarizer and allowing connection of two coaxial cables on opposing sides. Proximate a top end of polarizer 52, a tuning screw 58 protrudes into the interior of polarizer 52 to tune the resonant frequency of the antenna. Fastened on the top end of polarizer 52 is a tuning iris plate 60, with a central aperture of restricted diameter to act as bandpass filter on polarizer 52.

A shim and alignment pins are fastened above iris plate 60 to correctly position a circular waveguide 62 thereby coupled to polarizer 52. A circular choke 64 is attached to an outer surface of waveguide 62 to increase directionality of antenna 50. Dimensions and positioning of each component of antenna 50 are calculated to result in desired functional properties of antenna 50, such as polarization, resonant frequency, and directionality. However, some surfaces and structures of conventional antenna 50 are critical to the electromagnetic properties of the antenna, while others are structurally and mechanically important.

Additively manufactured antenna 110 may be configured to retain the electromagnetically and functionally critical features of conventional antenna 50, with alterations to structural and mechanically important features to enable additive manufacture. Antenna 110 may also replace electromagnetically functional features such as tuning screw 58 with a functional equivalent, such as a tuning iris. Antenna 110 may be configured to connect to electronics used with conventional antenna 50.

Figure 5:
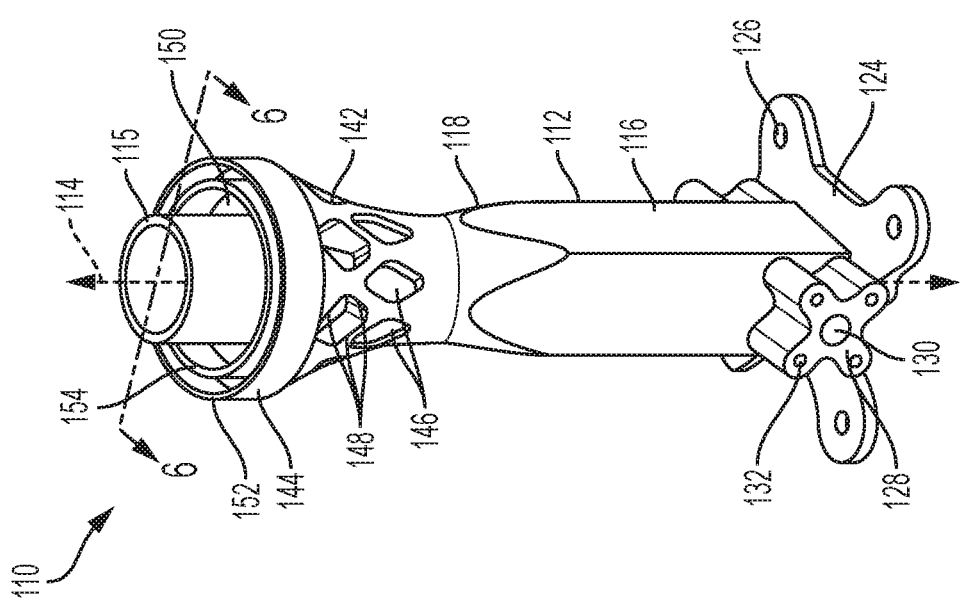
FIG. 5 is an isometric view of an illustrative additively manufactured command horn antenna in accordance with aspects of the present disclosure.

As shown in FIG. 5, antenna 110 is unitary. That is, the antenna is a single piece and does not require assembly other than attaching coaxial adaptors as further described below. The single piece antenna may also have improved reliability and/or fewer failure modes. The antenna is configured for manufacture without secondary supports. In other words, no support structures need to be removed after manufacture of the antenna. The depicted embodiment of antenna 110 requires minimal post-processing in the form of machining fastener apertures at a bottom end of the antenna, and interior surfaces of tuning irises as described in greater detail below. The antenna may be configured such that surface roughness resulting from manufacture is limited sufficiently that overall surface finishing is not needed.

Antenna 110 may be configured for manufacture by Direct Metal Laser Sintering (DMLS). The antenna comprises a sintered aluminum alloy, specifically AlSi10Mg Type II in the present embodiment. The alloy may provide good strength, hardness, and high load tolerance, along with low weight. Any metal or alloy of similarly appropriate properties may be used, in any effective additive manufacturing process.

Antenna 110 is configured for radio communication within a frequency band. That is, the antenna is tuned to a range of radio frequencies. In the depicted embodiment, antenna 110 is tuned to the Ku band.

Antenna 110 includes a hollow, elongate guide pipe 112 that defines a central axis 114. Central axis 114 may be described as determining a manufacturing orientation of antenna 110. When the antenna is manufactured, central axis 114 may be parallel to a vertical or z-axis of the manufacturing equipment. Antenna 110 may consequently comprise a plurality of planar layers that are perpendicular to central axis 114.

Guide pipe 112 includes a generally circular upper portion 115 and a generally square lower portion 116, joined by a shouldered transitional portion 118. The guide pipe is hollow throughout, having an interior cavity 120 with an inner surface 122. Upper portion 115 has a circular inner cross-sectional shape, while lower portion 116 has a square inner cross-sectional shape. Interior cavity 120 may also be described as rectangular at a lower end and circular at an upper end.

A base plate 124 is formed at a bottom end of lower portion 116 of guide pipe 112. The base plate occludes interior cavity 120, closing the end of the guide pipe. Base plate 124 also extends out from guide pipe 112, on first and second opposing sides and at each corner. FIG. 12 shows an underside of antenna 110 and base plate 124. An aperture 126 extends vertically through the base plate at each of the four corners. Apertures 126 are configured to receive fasteners, so that base plate 124 and antenna 110 may be fastened to another structure. Apertures 126 may be machined or drilled into base plate 124, subsequent to additive manufacturing of antenna 110.

As shown in FIGS. 5 and 7, on each of third and fourth opposing sides of lower portion 116, a connector support structure 128 extends perpendicularly out from guide pipe 112. Each support structure 128 has a rounded cross or x-shape. The two crosspieces of the x-shape are inclined at approximately 45 degrees relative to central axis 114, such that no overhang of support structure 128 is at less than approximately 45 from horizontal. This may prevent unwanted surface roughness, while allowing for minimal material use.

A central aperture 130 extends through connector support 128 into interior cavity 120 of guide pipe 112. The central aperture may be sized to receive a coaxial connector or adaptor. At each end of each crosspiece of support 128, a fastener aperture 132 is disposed. Fastener apertures 132 may not extend into interior cavity, but may be configured to receive and engage screws or other fasteners of a coaxial connector or adaptor. Apertures 130, 132 may be machined or drilled into connector supports 128, subsequent to additive manufacturing of antenna 110.

In some examples, command horn antenna 110 may be configured for connection to other supports or electronic components. Base plate 124 and/or connector supports 128 may include any appropriate connection features. In some examples, apertures 126, 130, and/or 132 may be created as part of the additive manufacturing process. In such examples, the apertures may have a diamond shape rather than a circular shape.

As shown in FIGS. 6 and 9-11, lower portion 116 of guide pipe 112 includes a stepped septum 134. The septum is a thin plate, extending across interior cavity 120 between the first and second opposing sides of lower portion 116. That is, septum 134 extends generally perpendicular to connector supports 128 and between those two sides of lower portion 116 not including the connector supports. The septum and connector supports 128 are positioned such that a coaxial adaptor fastened to one of the connector supports contacts each planar face of septum 134.

FIG. 8 shows an illustrative coaxial adaptor 136 configured to mate with a coaxial cable end and facilitate electrical contact between the cable and a side of septum 134. Antenna 110 may be thereby excited by two connected coaxial cables from a connected radio transmitter or receiver. In some examples, other adaptors or connectors may be connected to antenna 110. For example, antenna 110 may be configured to be excited by two perpendicular rectangular waveguides.

Figure 6:
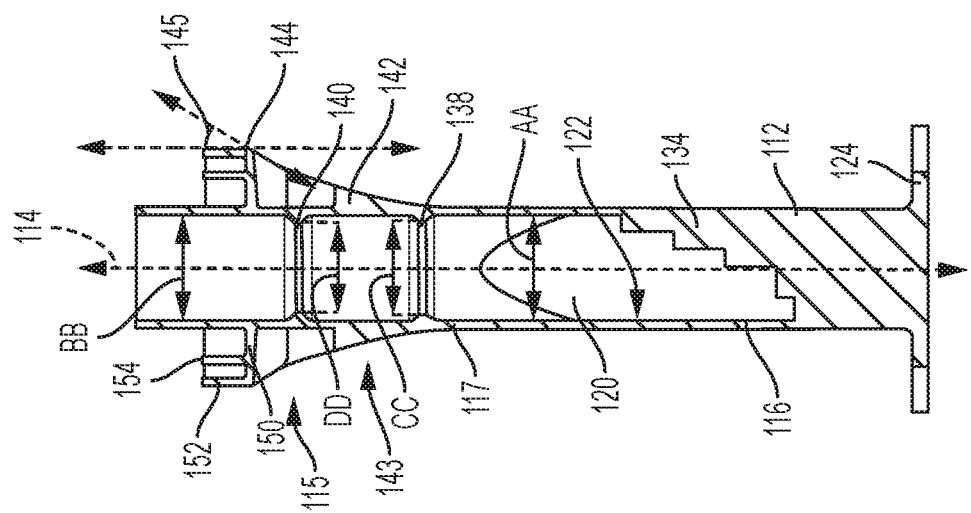
FIG. 6 is a cross-sectional view of the antenna of FIG. 5, along line 6-6.

Septum 134 may have any appropriate shape. As shown in FIG. 6, the septum may extend between two lines on inner surface 122 of guide pipe 112, for some non-zero distance. Above this point, the septum may be sloped or may include any number or size of steps. Size and step pattern of septum 134, independently and relative to dimensions of lower portion 116 of guide pipe 112, may be chosen by one skilled in the art to produce desired performance. Septum 134 may be configured to circularly polarize a radio signal.

Interior cavity 120 also includes a shouldered shape at shouldered transitional portion 118 of guide pipe 112. The interior cavity transitions between a square shape having a width AA, as shown in FIG. 6, to a circular shape having a matching diameter BB. Width AA and diameter BB may remain constant along a full length of interior cavity 120, except at a first iris 138 and a second iris 140. In some examples width AA and diameter BB may differ. In some examples, width AA and/or diameter BB may increase gradually along the length of guide pipe 112.

Irises 138, 140 protrude from inner surface 122, restricting the diameter of interior cavity 120. Each iris is chamfered, curving from inner surface 122 to a flat inner ring. The diameter of the inner ring may be described as the diameter of the iris. First iris 138 has a diameter CC, while second iris 140 has a diameter DD. First diameter CC may be greater than second diameter DD. The diameter and/or height of the inner ring may be selected based on a desired frequency range of antenna 110. Irises 138, 140 may function as a band-pass filter, where the passed frequencies correlate to the diameters of the irises.

The chamfering on each iris may be gradual, such that at no point along the curve does the surface form an angle of less than approximately 45 degrees with central axis 114. This structure may control the thermal profile of the iris structures, in turn controlling the geometry produced by additive manufacturing. Surface roughness on the overhang may be reduced, and the iris structures may be manufacturable with repeatable, consistent geometry. As the iris diameter is important to the functional properties of antenna 110, the inner ring of each iris 138, 140 may be machined subsequent to additive manufacture of the antenna.

A lattice structure 142 is formed on an outer circumferential side 143 of upper portion 115 of guide pipe 112. The structure may also be referred to as a lattice stiffening structure, a supportive framework, or a reticulated support, and the outer circumferential side may be referred to as an outer surface. Lattice structure 142 circumferentially surrounds a wall 117 of upper portion 115, extending radially out from the wall. In examples where upper portion 115 is non-circular, lattice structure 142 may peripherally surround the upper portion and extend perpendicularly from the wall. Lattice structure 142 may also be described as part of or as forming outer side 143 of upper portion 115 and guide pipe 112.

A choke structure 144 extends from wall 117 of upper portion 115, proximate an upper end of lattice structure 142. Choke 144 may be supported by lattice 142, and the lattice may be configured to avoid secondary printing requirements resulting from the choke. A vertical position of choke 144 relative to irises 138, 140 and/or septum 134 may be selected to produce desired performance of antenna 110. A height or vertical extent of lattice structure 142 may be determined by the position of choke 144.

A shown in FIG. 7, wall 117 of upper portion 115 has an outer diameter EE and choke 144 has an outer diameter of FF. Upper portion 115 may have a wall thickness of between 20 mils and 60 mils. Outer diameter FF of choke 144 may be determined by desired functional properties of the choke. Lattice structure 142 flares outward from upper portion 115 to choke 144, increasing from diameter EE to diameter FF. Guide pipe 112 may also be described as flaring outward toward choke 144.

In the depicted embodiment, lattice structure 142 flares in sloped sections. The lattice may also curve outward or gradually increase in any appropriate shape. An angle 145 of outward flare may vary along the lattice, but the average of angle 145 may be less than approximately 50 degrees or less than approximately 45 degrees. Outward flare angle 145 at any point along the lattice may also be less than approximately 50 degrees or less than approximately 45 degrees.

Lattice support structure 142 includes an array of diamond shaped openings 146, which may be seen in more detail in FIG. 5. Openings 146 are regularly spaced around the exterior circumference of upper portion 115, and along the length of the upper portion. FIGS. 10 and 11 are cross-sectional views of lattice structure 142 along lines 10-10 and 11-11 in FIG. 7, and show the equal distribution of openings 146. The openings may also be spaced or arranged in any structurally effective pattern.

As can be seen in FIG. 6, a depth of each opening 146 may be defined from an outer surface of lattice support structure 142 and guide pipe 112 to an outer surface of wall 117. The depth of each opening may vary along the length of upper portion 115, as lattice structure 142 flares outward.

Each diamond shaped opening 146 includes four inner surfaces 148. Each of the upper two of inner surfaces 148 may be angled at less than approximately 45 degrees relative to central axis 114. Each inner surface may be rounded or filleted where the surface meets another inner surface 148, and/or an outer surface of wall 117.

Referring again to FIG. 5, choke 144 includes a circular base 150 extending from outer surface 143 of upper portion 115, and concentric with the upper portion. Extending vertically up from base 150 are an outer ring 152 and an inner ring 154. Both outer ring 152 and inner ring 154 are concentric with upper portion 115. The choke may also be described as having a double walled cup-shape or as concentric hollow cylinders closed at a bottom end. Dimensions and positioning of choke 144 may be determined by desired functional properties of the choke. The choke may be configured to limit radio frequency output of antenna 110 in a vertically downward direction. The choke may also be configured to increase directionality of antenna 110, or otherwise alter a radiation pattern of the antenna.

In some examples, choke 144 may include only outer ring 152 and not inner ring 154. The choke may include 3 or more rings, or may be non-circular in shape. For example, choke 144 may be square and lattice structure 142 may have a corresponding square cross-sectional shape proximate the choke.

B. Illustrative Cup Dipole Antenna

As shown in FIGS. 14 and 16-26, this section describes an additively manufactured cup dipole antenna, generally indicated at 210. Antenna 210 includes an antenna framework 212, which is an example of additively manufactured antenna component 10, as described above. The cup dipole antenna may also be described as a turnstile antenna, or a crossed dipole antenna.

Figure 13:
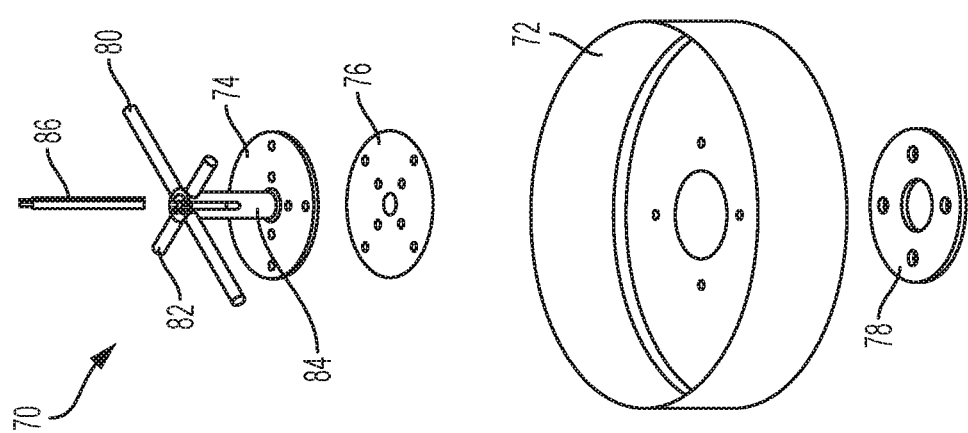
FIG. 13 is an exploded isometric view of an illustrative conventionally manufactured cup dipole antenna as described herein.
Figure 15:
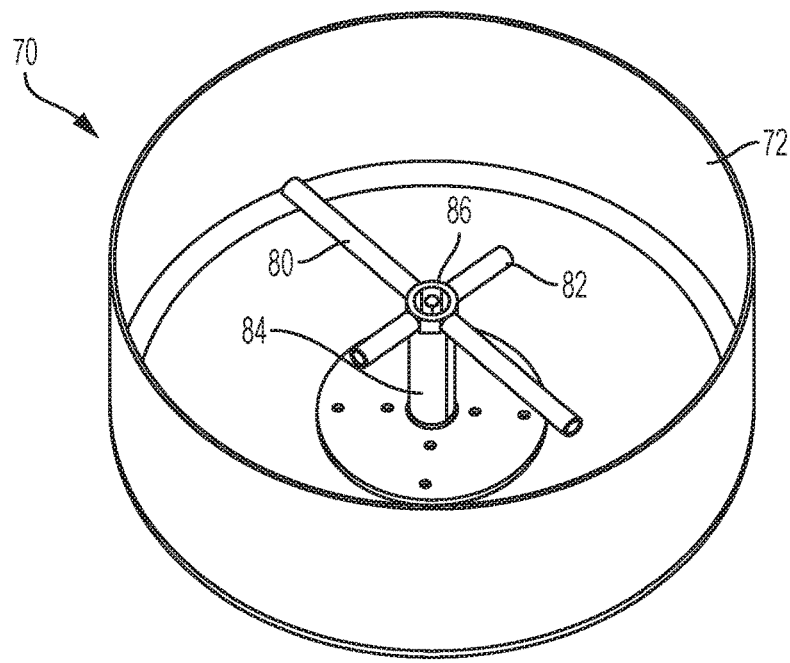
FIG. 15 is an isometric view of the antenna of FIG. 13.

FIGS. 13 and 15 show a design for a conventional, subtractively manufactured cup dipole antenna, generally indicated at 70. Conventional antenna 70 comprises a plurality of separately machined components, each screwed, bonded, or otherwise fixed together. The antenna includes a generally cylindrical, conductive cup 72 with a central aperture. A dipole structure 74 is fastened inside cup 72, over the aperture, with a gasket 76. An adaptor 78 is similarly fastened at an underside of cup 72, to facilitate connection of a coaxial cable to dipole structure 74, through the aperture of the cup.

Dipole structure 74 includes two dipoles disposed perpendicular to each other, a longer dipole 80 and a shorter dipole 82. The dipoles are mounted on a split-tube balun 84, which includes a separate conductor 86 that must be installed in the balun. The balun is configured to transform the unbalanced signal from a connected coaxial cable to a balanced signal of appropriate impedance.

Longer dipole 80 and shorter dipole 82 are of lengths selected to tune antenna 70 to a selected frequency band, and of appropriate relative length to result in phase quadrature between the two dipoles. Antenna 70 is therefore circularly polarized. Cup 72 may be configured to act as a resonant cavity, and to direct radio frequency signals.

Dimensions and positioning of each component of conventional antenna 70 are calculated to result in desired functional properties of the antenna, such as polarization, resonant frequency, and directionality. However, some surfaces and structures of conventional antenna 70 are critical to the electromagnetic properties of the antenna, while others are structurally and mechanically important.

Additively manufactured antenna 210 may be configured to retain the electromagnetically and functionally critical features of conventional antenna 70, with alterations to structural and mechanically important features to enable additive manufacture. Antenna 210 may also alter electromagnetically critical features such as the length of the crossed dipoles to maintain equivalent functionality despite consequences of structural changes, such as changes to reactance of the dipoles due to increased area.

Figure 14:
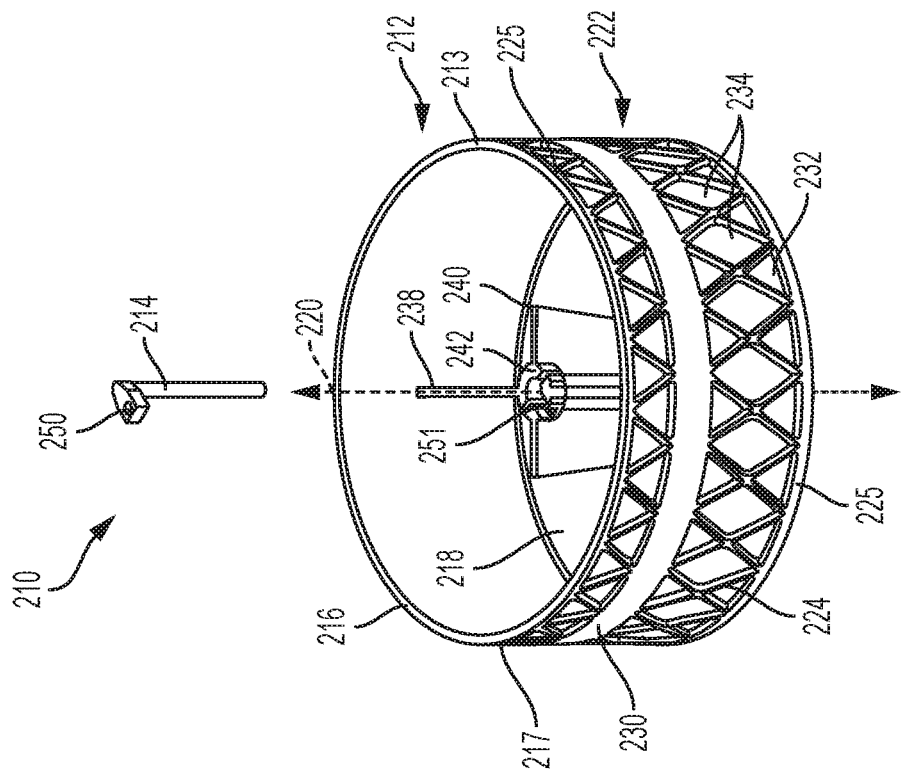
FIG. 14 is an exploded isometric view of an illustrative additively manufactured cup dipole antenna in accordance with aspects of the present disclosure.

As shown in FIG. 14, antenna framework 212 of antenna 210 is unitary. That is, the antenna framework is a single piece, reducing overall assembly required for antenna 210. Single piece antenna framework 212 may also improve reliability of antenna 210 and/or reduce failure modes for the antenna.

The antenna is configured for manufacture without secondary supports. In other words, no support structures need to be removed after manufacture of the antenna. The depicted embodiment of antenna framework 212 requires limited post-processing in the form of machining detailed features such as a balun and a bottom surface, as described in greater detail below. The antenna may be configured such that surface roughness resulting from manufacture is limited sufficiently that overall surface finishing is not needed.

Antenna 210 may be configured for manufacture by Direct Metal Laser Sintering (DMLS). The antenna comprises a sintered aluminum alloy, specifically AlSi10Mg Type II in the present embodiment. The alloy may provide good strength, hardness, and high load tolerance, along with low weight. Any metal or alloy of similarly appropriate properties may be used, in any effective additive manufacturing process.

Antenna 210 is configured for radio communication within a frequency band. That is, the antenna is tuned to a range of radio frequencies. In the depicted embodiment, antenna 210 is tuned to the L band.

Antenna 210 includes antenna framework 212 and a conductive core 214. Antenna framework 212 comprises a cup 213 and an inner dipole structure, the cup including a cylindrical body 217 and a circular base 218. Cup 213 may form a circular radiating aperture for antenna 210. The cup may also be described as an elongate tubular structure, and/or a hollow cylinder closed at one end.

Cup 213 may be approximately 7 inches in diameter, 7.5 inches in diameter, or between 6 and 8 inches in diameter. The cup may be approximately 4 inches in height, approximately 4.5 inches in height, or between 3 and 5 inches in height. An internal height of cup 213 may correspond to a selected wavelength. Dimensions of cup 213 may also be determined by desired functional properties of antenna 210.

Antenna framework 212 has a central axis 220, on which cylindrical cup body 217 is centered. Central axis 220 may be described as determining a manufacturing orientation of antenna framework 212. When the antenna framework is manufactured, central axis 220 may be parallel to a vertical or z-axis of the manufacturing equipment. Antenna framework 212 may consequently comprise a plurality of planar layers that are perpendicular to central axis 220.

Cup body 217 includes a circular wall 216, and a lattice stiffening structure 224 on an outer circumferential side 222. The stiffening structure may be described as a raised grid on cup wall 216, and includes an array 232 of openings or recesses 234. Recesses 234 include diamond shapes and half-diamond or triangular shapes. Stiffening structure 224 is an example of lattice stiffening structure 14 as described above. The stiffening structure may also be described as a plurality of intersecting raised lines extending from the outer surface of cup wall 216, each line forming an angle of no more than approximately 45 degrees with central axis 220.

At top and bottom edges of cup wall 216, stiffening structure 224 further includes rims 225. Each rim may extend circumferentially around cup 213 and parallel to cup base 218. The rim at the top edge of cup wall 216 may be chamfered at approximately a 45 degree angle.

A thickness of stiffening structure 224, which may be also be referred to as a depth of recesses 234 may be approximately 45 mils, may be between 40 and 50 mils, or may be between 20 and 60 mils. Outer wall 216 may have a thickness of about 40 mils, or between 20 and 60 mils. Stiffening structure 224 may stiffen and reinforce the thin outer wall, improving structural strength. The stiffening structure may also be configured to maintain the circular shape of cup 213 and thereby circularity of the aperture of antenna 210.

Stiffening structure 224 is divided into an upper section 226 and a lower section 228 separated by a cover coupling ring 230. Cover coupling ring 230 is similarly raised from the outer surface of cup wall 216, with an equal or greater thickness as compared to stiffening structure 224. A bottom edge of the ring may be chamfered at approximately a 45 degree angle. Cover coupling ring 230 may have a smooth surface, configured for effective bonding of an adhesive. In some examples, the ring may include recesses, grooves, or other features configured to facilitate connection of an antenna cover.

The internal dipole structure of antenna framework 212 includes a long dipole 238 and a short dipole 240, each connected to a balun tube 236. Balun tube 236 is cylindrical, with an octagonal flange 242 at a top end. The balun tube is hollow, having a central circular cavity aligned with a central circular aperture of cup base 218. Balun tube 236 extends up from cup base 218, and is joined to the cup base. Octagonal flange 242 may be chamfered, and/or filleted, such that the flange does not extend out perpendicularly from an outer surface of balun tube 236. In the depicted example, the intersection of octagonal flange 242 and the outer surface of balun tube 236 is beveled at approximately 45 degrees.

Figure 16:
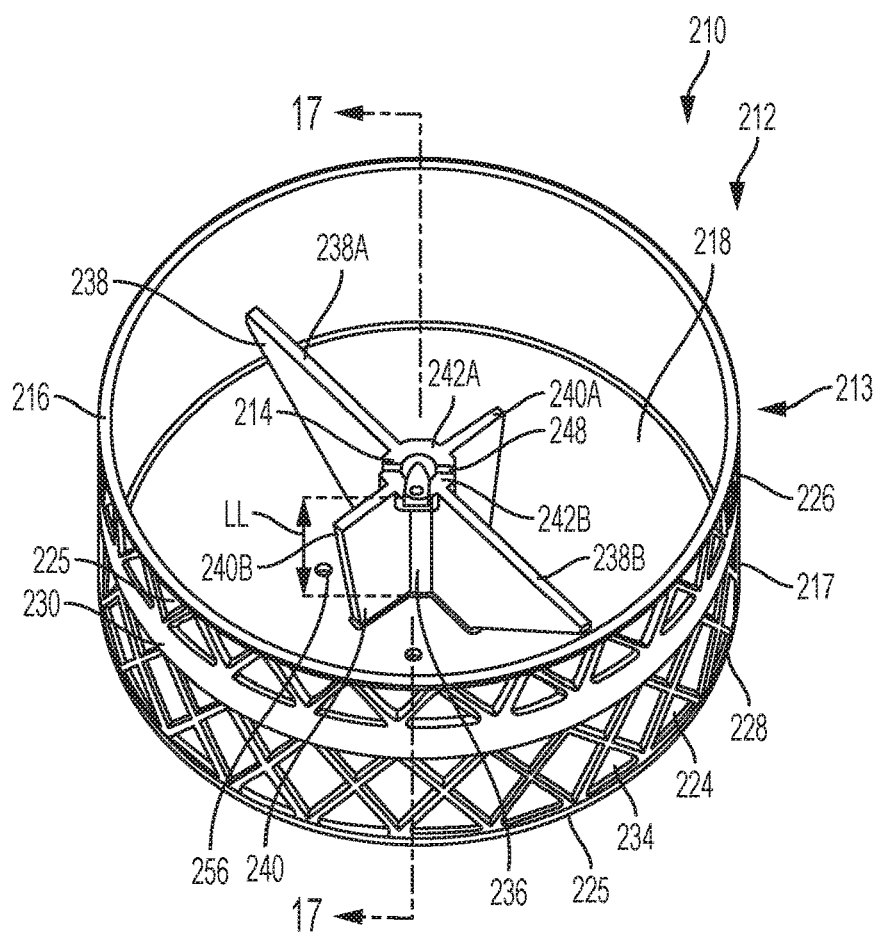
FIG. 16 is an isometric view of the antenna of FIG. 14.

Long dipole 238, which may be seen more clearly in FIG. 16, includes a first pole 238A and a second pole 238B, each of which is planar or sheet-shaped and extends both from base 218 of cup 213 and from balun tube 236. Short dipole 240 includes a first pole 240A and a second pole 240B, each of which is planar or sheet-shaped and extends both from base 218 of cup 213 and from balun tube 236.

Figure 17:
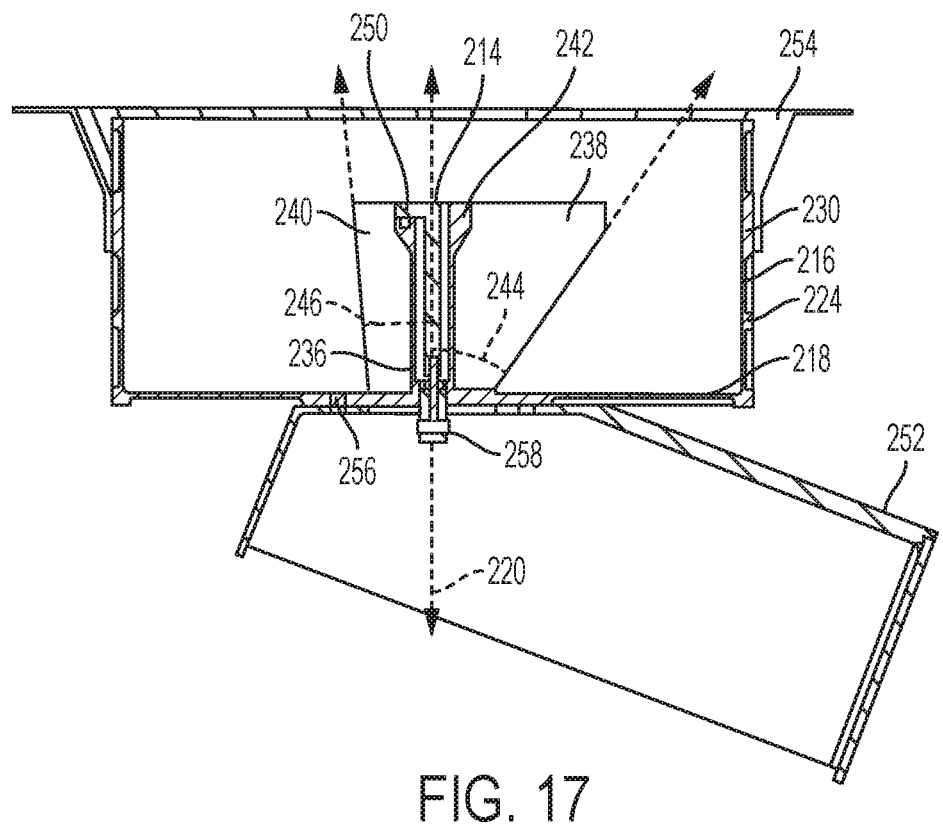
FIG. 17 is a cross-sectional view of the antenna of FIG. 14 along line 17-17 in FIG. 16 and further including mounting accessories.

As shown in FIG. 16, each pole 238A, 238B, 240A, 240B has a trapezoid shape, with parallel upper and lower edges. An outer edge of each pole forms an angle relative to balun tube 236 and central axis 220, as shown in FIG. 17. Poles 238A, 238B form a first angle 244 with central axis 220, and poles 240A, 240B form a second angle 246 with central axis 220. First angle 244 is greater than second angle 246, and each angle is less than approximately 45 degrees. In some examples, angles 244 and 246 may be equal or angle 246 may be greater than angle 244.

Figure 18:
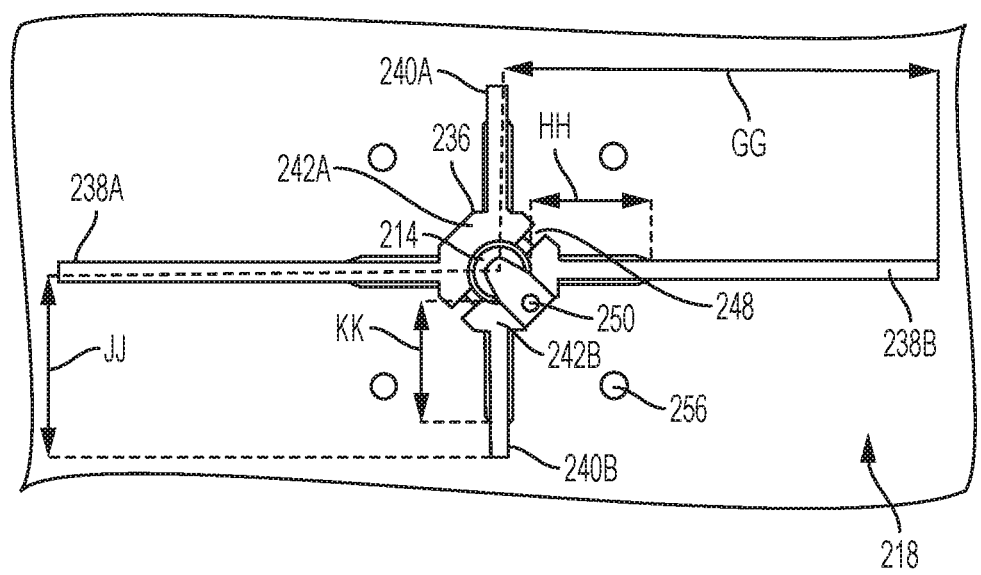
FIG. 18 is a top view of the dipole structure of the antenna of FIG. 14.

First and second poles 238A, 238B are parallel, coplanar, coextensive, and of matching dimensions. First and second poles 240A, 240B are similarly parallel, coplanar, coextensive, and of matching dimensions. In the depicted embodiment, all four poles have a matching thickness. Each pole of long dipole 238 is perpendicular to each pole of short dipole 240. As shown in FIG. 18, the first and second poles of long dipole 238 have an upper length GG and a lower length HH. The first and second poles of short dipole 240 have an upper length JJ and a lower length KK.

Each pole is connected to cup base 218 along the full extent of lower length HH or KK. The lower lengths and connection to cup base 218 may be provide structural strength and stiffness to dipoles 238, 240 both during additive manufacturing and during use of antenna 210. In the present embodiment, lower lengths HH and KK are the same. In some examples, the lower lengths may differ.

Upper lengths GG and JJ may be chosen to achieve a desired phase difference between signals in long dipole 238 and short dipole 240. Specifically, the lengths may be chosen to achieve phase quadrature and thus circular polarization of antenna 210. Lengths GG and JJ, lateral dimensions of antenna 210, may be proportional to a selected wavelength. For example, upper length GG of long dipole 238 maybe one quarter the wavelength of the central frequency of the L band, or approximately 2 inches. In some examples, GG and JJ may be correlated to a selected wavelength. For example, a dipole upper length may be shorter than resonant length by a factor depending on impedance of the dipole.

Balun tube 236 is configured to act as a split sheath balun in cooperation with conductive core 214. In other words, balun tube 236 and conductive core 214 are configured to transform an unbalanced signal from a connected coaxial cable to a balanced signal of appropriate impedance. As shown in FIG. 16, balun tube 236 has a height LL and each dipole 238, 240 has a matching height. Height LL may be proportional or correspond to a selected wavelength.

Two slots 248 extend vertically through balun tube 236, from octagonal flange 242 down toward cup base 218. Slots 248 may have a length less than height LL, and an upper portion of balun tube 236 may be split by the slots. The length of slots 248 may be chosen to match out the reactance of dipoles 238, 240. The slot length may also be proportional or correspond to a selected wavelength. In some examples, slots 248 may extend the full height LL of balun tube 236, and the tube may comprise two separate structures, each joined to cup base 218.

As depicted in FIG. 18, octagonal flange 242 is divided into an unconnected portion 242A and a connected portion 242B. Poles 238A and 240A are joined to unconnected portion 242A, while poles 238B and 240B are joined to connected portion 242B. Unconnected portion 242A does not contact conductive core 214, and the core is fastened to connected portion 242B by a tab 250.

Core tab 250 is can be seen more clearly in FIGS. 14 and 17. The tab rests in a recess 251 of octagonal flange connected portion 242B that is shaped to snugly receive the tab. An aperture in core tab 250 aligns with a threaded aperture in recess 251 that is configured to receive a fastener. Conductive core 214 may be thereby mechanically fixed to antenna framework 212 by a fastener. In some examples, core tab 250 may be bonded or otherwise attached to antenna framework 212.

Conductive core 214 extends down from core tab 250, through the hollow interior of balun tube 236, without contacting the tube. Conductive core 214 may also connect to antenna framework 212 in any electrically equivalent and effective manner. The conductive core may be manufactured separately from antenna framework 212, and may be conventionally or additively manufactured. Conductive core 214 may comprise the same material as antenna framework 212, may comprise the same alloy of aluminum, or may comprise any appropriate conductive material.

FIG. 17 shows a mounted configuration of antenna 210, including a mounting bracket 252 and a sunshade 254. Sunshade 254 extends over the open end of cup 213, and is configured to shield antenna 210 from solar radiation. The sunshade is bonded to cover coupling ring 230. Sunshade 254 may comprise an insulating and/or reflective material, and may be manufactured separately to antenna 210.

Mounting bracket 252 may be part of, or fastened to a structure to which antenna 210 is mounted. For example, mounting bracket 252 may form part of an outer housing of a communications satellite. Cup base 218 includes fastening apertures configured for attachment to mounting bracket 252. In the present example, cup base 218 includes four fastening/fastener apertures 256 which may be seen more clearly in FIG. 18. Fastening apertures 256 align with corresponding apertures on mounting bracket 252 to receive fasteners, not shown. Cup base 218 or other components of antenna 210 may include any features configured for attaching antenna 210 to mounting bracket 252 and/or other structures.

FIG. 17 further depicts a coaxial connector 258, extending through the central aperture of cup base 218 into balun tube 236. The connector is configured to interface with conductive core 214 at a first end, and a coaxial cable at a second end. Any effective connector may be used. In the present example, a pin of the connector is threaded into a recess in conductive core 214. Coaxial connector 258 is also supported by interface with cup base 218 and balun tube 236. In the present example, inner surfaces of balun tube 236 and cup base 218 are threaded and engage threading on connector 258. In some examples, connector 258 may be bonded to cup base 218 or may be fixed in any effective manner.

FIGS. 19, 21, 23, and 25 show an example of an additively manufactured blank 260 for antenna framework 212. The blank may be machined, drilled, or otherwise post-processed to produce antenna framework 212, as shown in FIGS. 20, 22, 24, and 26. The views in FIGS. 19-26 are organized such that corresponding view of blank 260 and antenna framework 212 are adjacent, for comparison. Features of antenna framework 212 included in the blank may be referred to as printed features, and features produced during post-processing may be referred to as finished features.

Figure 19:
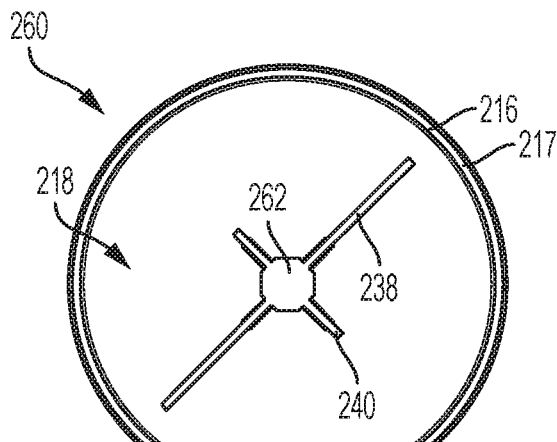
FIG. 19 is a top view of an illustrative additively manufactured blank for the antenna of FIG. 14, as described herein.

FIG. 19 is a top view of blank 260, showing dipoles 238, 240 and a solid central core 262. The core and dipoles are also shown isometrically in FIG. 25. Dipoles 238, 240 and beveled octagonal flange 242 are printed features, but features of balun tube 236 are finished. In other words, solid core 262 is machined to produce balun tube 236 as described above and shown in FIGS. 20 and 26. The solid core 262 is hollowed out and slots 248 are cut. A bottom end of balun tube 236, proximate cup base 218, may also be tapped to produce threads. Recess 251 is machined into octagonal flange 242, and a threaded aperture drilled and tapped into the recess.

Figure 20:
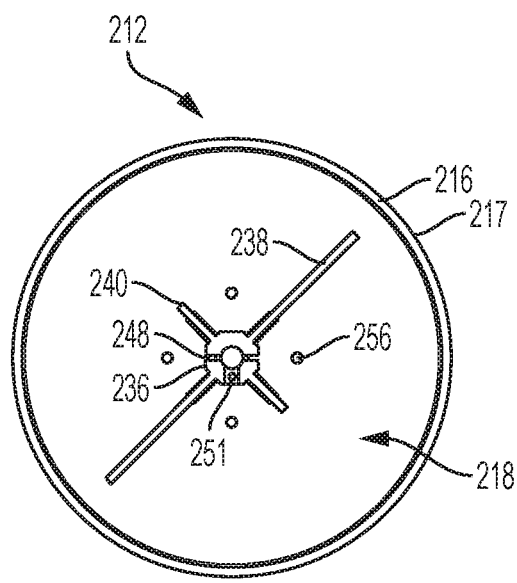
FIG. 20 is a top view of the antenna of FIG. 14, without the conductive core.
Figure 21:
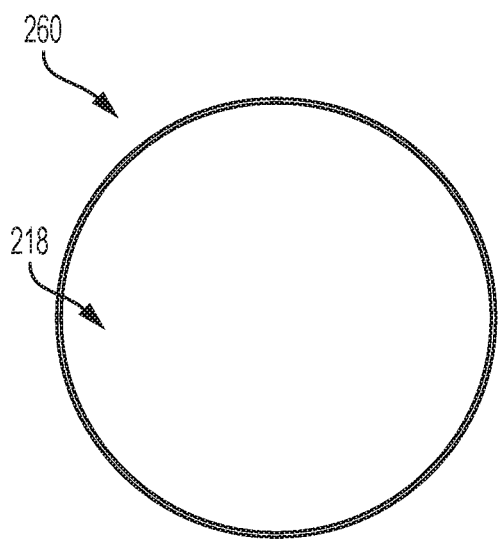
FIG. 21 is a bottom view of the additively manufactured blank of FIG. 19.
Figure 22:
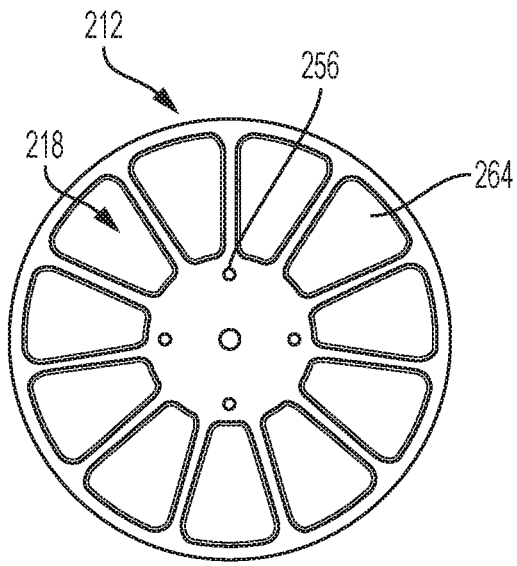
FIG. 22 is a bottom view of the antenna of FIG. 14.

Cup base 218 is printed as a solid structure with a planar surface, as shown in FIG. 21. The central aperture of cup base 218 and fastener apertures 256 are drilled through the cup base, as shown in FIGS. 20, 22. Either or both apertures may also be tapped to produce threads. The cup base may be printed thicker than desired for antenna framework 212, by approximately 50 mils. This material may allow the printed body to be machined off of a printer base or support plate.

A pattern of recesses 264 is also machined into a bottom surface of cup base 218, as shown in FIG. 22. In the depicted example, pattern 264 has a wagon-wheel shape. Any appropriate pattern of recesses may be used. The recesses may serve to reduce weight of antenna framework 212 while maintaining and/or improving structural properties of cup base 218 such as stiffness and strength.

Figure 23:
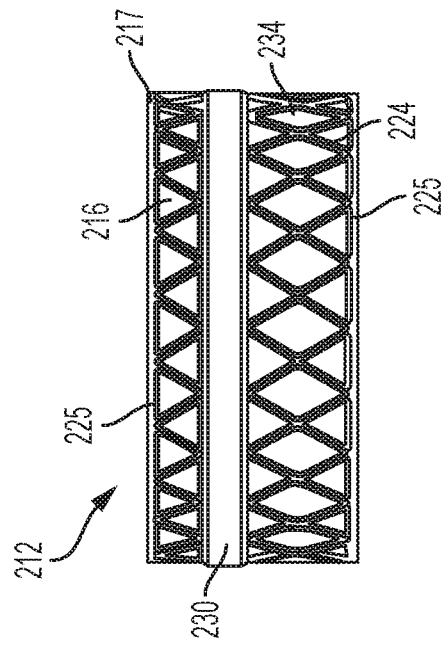
FIG. 23 is a side view of the additively manufactured blank of FIG. 19.
Figure 24:
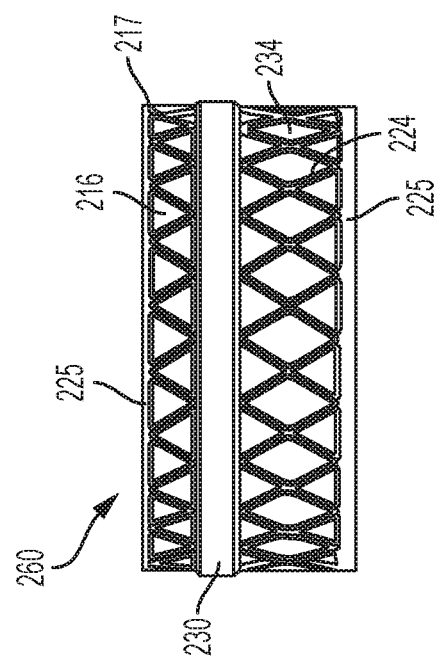
FIG. 24 is a side view of the antenna of FIG. 14.
Figure 25:
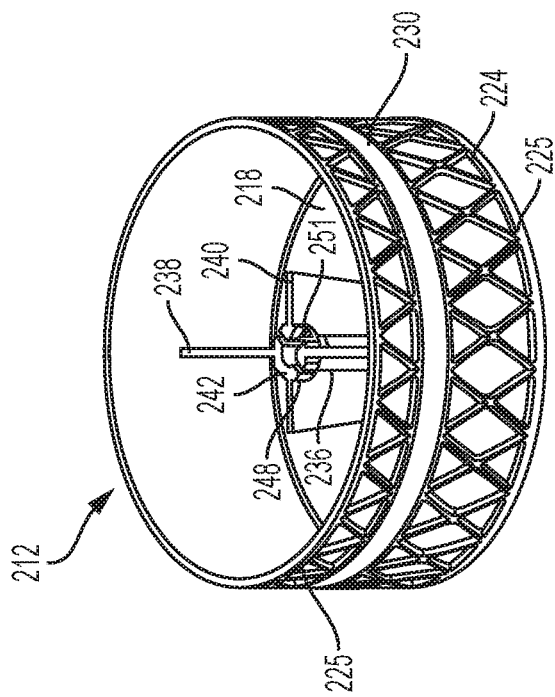
FIG. 25 is an isometric view of the additively manufactured blank of FIG. 19.
Figure 26:
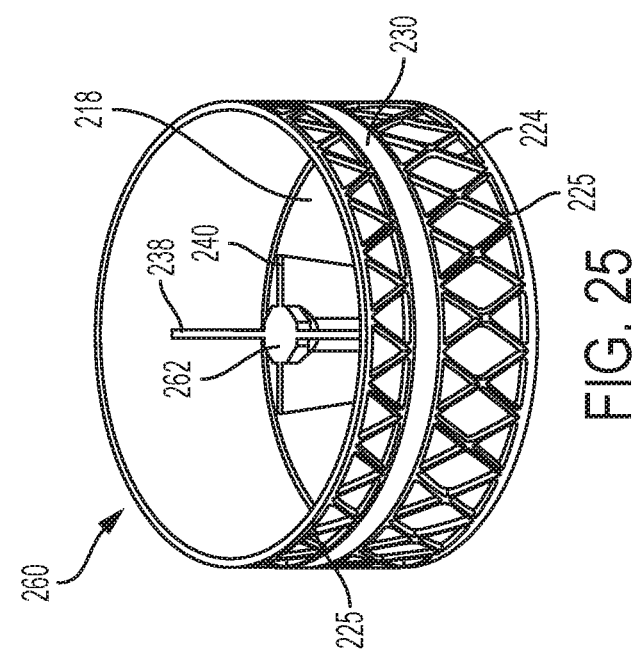
FIG. 26 is an isometric view of the antenna of FIG. 14.

FIG. 23 is a side view of blank 260, showing lattice stiffening structure 224 and cover coupling ring 230. Both the lattice and the ring may be printed features. Cover coupling ring 230 may also be machined to achieve a smooth surface appropriate for bonding. The ring as printed may include an additional 50 mils of material to be machined off. As printed cover coupling ring may be raised 70 mils further from the outer surface of cup wall 216 than stiffening structure 224. After machining, as shown in FIG. 24, the ring may remain 20 mils raised relative to the stiffening structure. This distance may serve to protect stiffening structure 224 during the machining process, and prevent undesirable alteration to the stiffening structure. Machining cover coupling ring 230 may result in a smooth surface, which may facilitate bonding of a sunshade as described above.

C. Illustrative Method of Additive Manufacture

Figure 27:
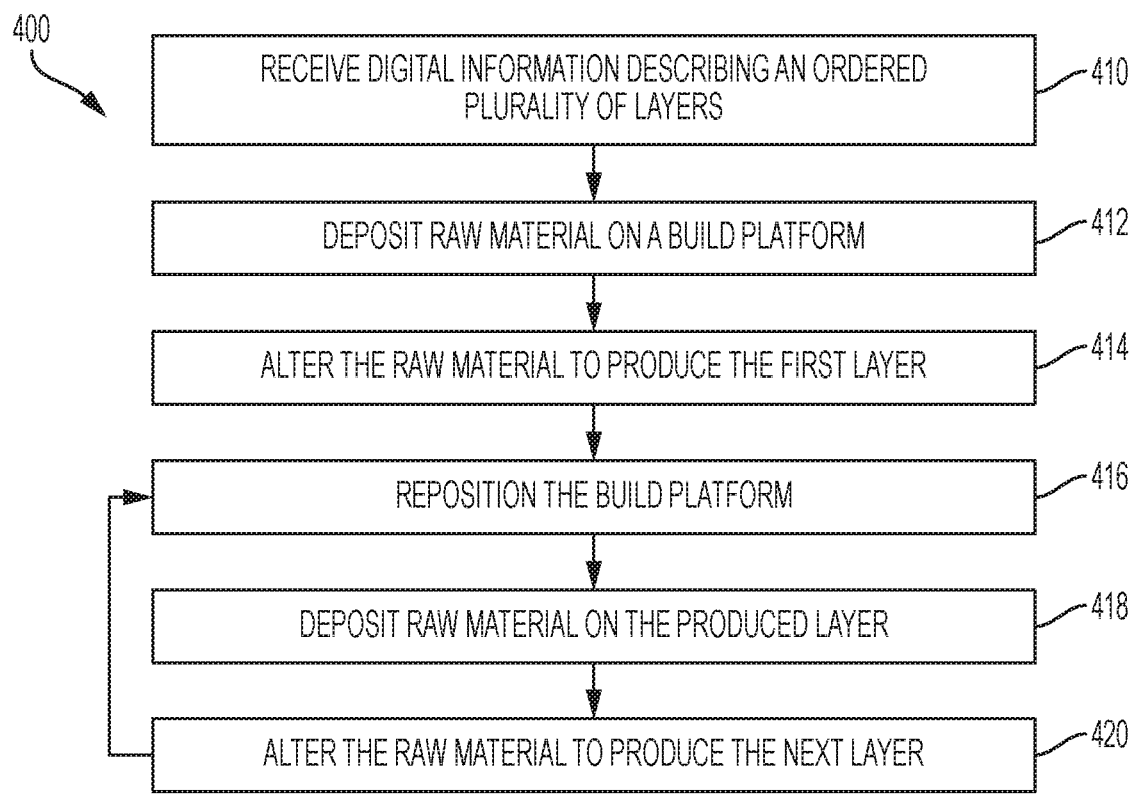
FIG. 27 is a flow chart depicting steps of an illustrative method of additive manufacture according to the present teachings.

This section describes steps of an illustrative method for additive manufacture of a workpiece; see FIG. 27. Aspects of an illustrative additive manufacturing device depicted in FIG. 28 may be utilized in the method steps described below. Where appropriate, reference may be made to components and systems that may be used in carrying out each step. These references are for illustration, and are not intended to limit the possible ways of carrying out any particular step of the method.

FIG. 27 is a flowchart illustrating steps performed in an illustrative method, and may not recite the complete process or all steps of the method. Although various steps of method 400 are described below and depicted in FIG. 27, the steps need not necessarily all be performed, and in some cases may be performed simultaneously or in a different order than the order shown.

Figure 28:
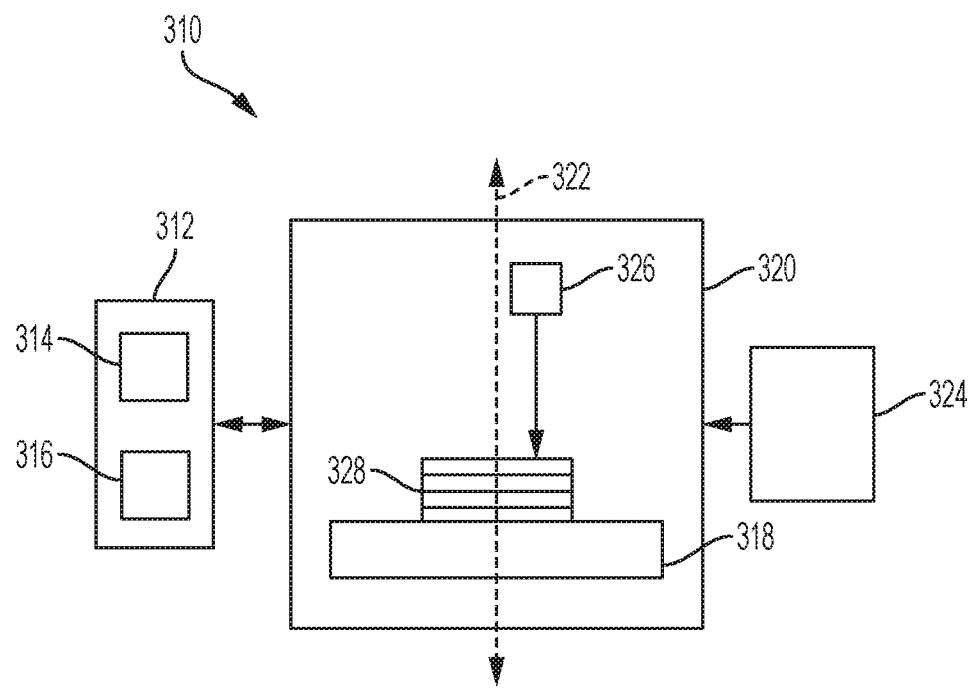
FIG. 28 is a schematic diagram of an illustrative additive manufacturing apparatus as described herein.

At step 410, digital information describing an ordered plurality of layers is received. The digital information may be received by a computer controller 312 of an additive manufacturing device 310 as depicted in FIG. 28. The additive manufacturing device may also be referred to as a printer, or a fabricator. Computer controller 312 may comprise any data processing system configured to receive digital design information and control functions of printer 310. The illustrative computer controller shown in FIG. 28 includes a processor 314 for controlling printer functions and memory 316 for storing received data.

The received information may include geometric data and/or design details for a plurality of two-dimensional patterns that constitute layers of a three-dimensional object, where the three-dimensional object is a workpiece 328 to be manufactured. For example, workpiece 328 may be a command horn antenna or a cup dipole antenna, as described above. The layers may also be described as cross-sections or slices. The plurality of layers is ordered, such that the layers may be numbered or organized from a first layer to a last layer.

Step 412 of method 400 includes depositing raw material on a build platform 318 located in a building environment 320 of printer 310. The build platform may comprise a support moveable by computer controller 312 along a manufacturing axis 322. The build platform may have a planar surface perpendicular to manufacturing axis 322.

The raw material may be any material appropriate to additive manufacturing, typically a fluid or powder and including but not limited to photopolymer resin, thermoplastic, plaster, ceramic, and metal. For an antenna as previously described, the raw material may be an aluminum alloy powder. The material may be distributed from a raw material source 324 such as a hopper, a tank, or a powder bed. For example, the aluminum alloy powder may be swept from a powder bed over build platform 318 by a brush arm actuated by computer controller 312.

The raw material may be distributed evenly over build platform 318, or may be deposited in a selected pattern. Depositing may be done under control of computer controller 312. In some examples, build platform 318 may be submerged in raw material and depositing may be accomplished by gravity or fluid pressure. In some examples, a print head 326 connected to raw material source 324 may deposit the raw material in a pattern corresponding to the first layer of the ordered plurality of layers.

At step 414, the raw material is altered to produce the first layer. In other words, a physical change is induced the deposited material, according to the design information describing the first layer of the ordered plurality of layers and as directed by the computer controller 312, to realize the first layer as a physical object on the build platform.

The material may be acted on by a print head 326 of printer 310, controlled by computer controller 312. For example, the print head may include a laser that cures a photopolymer by exposure to light. For the antennas as described above, print head 326 may comprise a laser that sinters a metal alloy powder by exposure to heat. The print head may be directed by computer controller 312 to follow a path delineated in the received digital information for the first layer, and/or a path calculated by processor 314 based on the received digital information.

Step 416 includes repositioning the build platform. In some examples, build platform 318 may start a selected distance from print head 326. The selected distance may be determined by the procedures performed by the print head. Subsequent to production of a layer, the build platform may be repositioned by computer controller 312 along manufacturing axis 322 away from print head 326 by the layer's thickness. That is, the build platform may be moved such that a top surface of the produced layer is the selected distance from print head 326.

In some examples, build platform 318 may start in alignment with another element of printer 310 such as a raw material distribution component. Subsequent to production of a layer, the build platform may be repositioned by computer controller 312 along manufacturing axis 322 such that a top surface of the produced layer is aligned with the other element of printer 310. In some examples, at step 416 print head 326 may be repositioned instead of or in addition to build platform 318. In some examples, step 416 may be skipped.

At step 418, raw material is deposited on the layer produced in the preceding step of method 400. As described for step 412, the raw material may be any appropriate material and may be deposited in any appropriate manner. At step 420, the raw material is altered to produce the next layer as previously described for step 414.

Steps 416 through 420 may be repeated to produce each layer of the plurality of layers of the received digital information, until the last layer is produced. The produced first through last layers may then comprise workpiece 338 as described in the received digital information. The workpiece may be removed from the printer and post-processed as desired. For example, an antenna as described above may be machined from a build plate of the build platform, and then fine details or smooth surfaces of the antenna may be further finished by machining or other methods.

D. Illustrative Method of Antenna Manufacture

Figure 29:
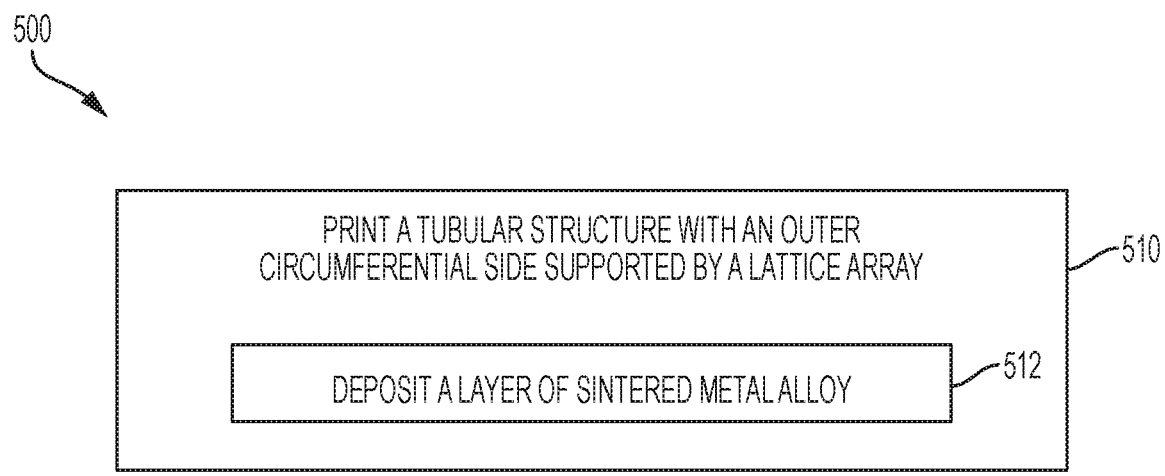
FIG. 29 is a flow chart depicting steps of an illustrative method of additively manufacturing an antenna according to the present teachings.

This section describes steps of an illustrative method for manufacturing an antenna; see FIG. 29. Aspects of antenna components, additive manufacturing methods, or additive manufacturing devices previously described may be utilized in the method steps described below. Where appropriate, reference may be made to components and systems that may be used in carrying out each step. These references are for illustration, and are not intended to limit the possible ways of carrying out any particular step of the method.

FIG. 29 is a flowchart illustrating steps performed in an illustrative method, and may not recite the complete process or all steps of the method. Although various steps of method 500 are described below and depicted in FIG. 29, the steps need not necessarily all be performed, and in some cases may be performed simultaneously or in a different order than the order shown.

Step 510 includes printing a tubular structure that has an outer circumferential side supported by a lattice array. The tubular structure may be configured to send and/or receive radio frequency signals. The tubular structure may also be configured for a selected polarization, resonant frequency band, radiation pattern, and/or any functional antenna properties. Antenna component 10 described above is an example of a tubular structure.

Printing may be done according to an additive manufacturing method such as method 400 described above. In particular, printing may be done by Direct Metal Laser Sintering (DMLS) of an aluminum alloy powder. The tubular structure may have a central axis, which may coincide with a vertical direction or manufacturing axis of the additive manufacturing method. In other words, the tubular structure may be printed in a vertical direction. Step 510 of printing may be carried out without using secondary supports.

The tubular structure may include a wall and a stiffening lattice array. The lattice array may support an outer circumferential side of the tubular structure, and/or may be described as circumferentially or peripherally surrounding some section of the wall. The tubular structure may further include an internal structure, and/or any appropriate functional or structural features.

The lattice array may include a plurality of diamond shaped openings. Each side of each diamond shaped opening may form an angle with the manufacturing axis. The angle may be less than approximately 45 degrees or less than approximately 50 degrees. The lattice array may be configured to increase a structural strength of the tubular structure, and/or to maintain a circular shape of the tubular structure through the printing process. The lattice array may be configured to support features of the tubular structure, to avoid a need for secondary supports. The diamond shaped openings of the lattice array may also be oriented to avoid a need for secondary support.

Method 500 may further include printing a base portion, connected to the tubular structure. The tubular structure may flare outward in a direction away from the base portion. The tubular structure may be described as including a body portion and a flared middle section on top of the body portion, the flared middle section including the lattice array on an external side.

The middle portion may flare at an angle selected to avoid need for secondary support, for example with an average flare angle of less than 50 degrees or of less than 45 degrees. The flare may also be described as an outwardly curved profile of the middle portion. In some examples, the middle portion may include an internal cavity with a circular cross-section and method 500 may further include printing an iris structure in the internal cavity.

Method 500 may further include printing an overhanging section on top of the flared middle section. The overhanging section may be a choke structure, supported by the lattice array. The choke structure may be connected to the tubular structure and distal to the base portion.

The printed tubular structure may be an antenna, antenna device, and/or a component of an antenna. In some examples, the tubular structure may be printed as part of a printed antenna or antenna component. For instance, step 510 may include forming a command horn antenna or a cup dipole antenna. In some examples, method 500 may further include incorporating the structure with other un-printed or separately printed components.

In some examples, method 500 may include steps to post-process the tubular structure such as machining, drilling, and/or surfacing finishing. The method may include machining connector holes in a base portion of the tubular structure, and/or machining fastener holes in the base portion.

Sub-step 512 of step 510 includes depositing a layer of sintered metal alloy, and may be repeated for a plurality of layers. Step 510 may therefore include depositing multiple layers of laser sintered metal alloy. The sintered metal alloy may be an alloy of aluminum, for example AlSi10Mg Type II. Depositing a layer may comprise spreading a layer of metal allow powder over the surface of a build platform and/or a previously deposited layer of sintered metal alloy. Further, depositing a layer may comprise delivering a laser beam generated by a laser to selected locations on the layer of powder, according to geometric data stored in the memory of a controlling data system, to sinter the powder.

E. Additional Examples and Illustrative Combinations

This section describes additional aspects and features of antenna components, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. An antenna device comprising:
an additively manufactured base portion,
an additively manufactured body portion attached to the base portion, the body portion including a plurality of lattice stiffening structures configured to eliminate secondary printing support, and
an additively manufactured top portion connected to the body portion.

A1. The antenna device of A0, wherein the base portion, body portion, and top portion form a command horn antenna.

A2. The antenna device of A0, wherein the base portion, body portion, and top portion form a cup dipole antenna.

A3. The antenna device of any of A0-A2, wherein the base portion, body portion, and top portion are comprised of laser sintered metal alloy.

A4. The antenna device of any of A0-A3, wherein the base portion, body portion, and top portion are comprised of laser sintered aluminum alloy.

A5. The antenna device of any of A0-A4, wherein the body portion flares outward toward the top portion.

A6. The antenna device of claim A5, wherein the body portion flares outward at an average angle of less than 50 degrees.

A7. The antenna device of any of A0-A6, wherein the lattice stiffening structure includes an array of diamond shaped openings.

A8. The antenna device of any of A0-A7, wherein the body portion includes a wall having a thickness of between 20 mils to 60 mils, and the lattice stiffening structure has a thickness of between 20 mils to 60 mils.

A9. The antenna device of any of A0-A8, wherein the lattice stiffening structure supports a choke structure configured to limit radio frequency output.

B0. An antenna component, comprising:
an elongate hollow body portion comprised of laser sintered alloy and configured to send or receive radio frequency signals.

B1. The antenna component of B0, wherein the body portion forms part of a command horn antenna.

B2. The antenna component of B0, wherein the body portion forms part of a cup dipole antenna.

B3. The antenna component of any of B0-B2, wherein the body portion contains printed sheet shaped poles.

B4. The antenna component of any of B0-B3, wherein the body portion has a lattice stiffening structure on a circumferential side configured to avoid a need for secondary support in an additive manufacturing procedure.

B5. The antenna component of B4, wherein the circumferential side of the body portion flares outwardly upward toward an overhanging structure.

B6. The antenna component of any of B0-B5, wherein the body portion has a lattice stiffening structure on a circumferential side configured to maintain a circular shape through an additive manufacturing procedure.

C0. A radio frequency channel structure, comprising:
a tubular portion having a circumferential lattice stiffening structure, and internal structure configured to optimize sending or receiving radio signals.

C1. The radio frequency channel structure of C0 wherein the lattice stiffening structure includes an array of diamond shaped openings.

C2. The radio frequency channel structure of C1, wherein each side of each diamond shaped opening forms an angle of less than 50 degrees with a vertical axis of the tubular portion.

C3. The radio frequency channel structure of any of C0-C2, wherein the tubular portion has a lower end and an upper end, the lower end being connected to a base portion configured for mounting on a surface, the upper end being connected to a top portion having an opening.

C4. The radio frequency channel structure of any of C0-C3, wherein an axial direction is defined from the base portion through the tubular portion and the top portion, the tubular portion having a gradually increasing outer circumference.

C5. The radio frequency channel structure of any of C0-C4, wherein the tubular portion comprises laser sintered metal alloy.

C6. The radio frequency channel structure of any of C0-C5, wherein the tubular portion is comprised of laser sintered aluminum alloy.

C7. The radio frequency channel structure of any of C0-C6, wherein the tubular portion includes an internal iris structure having a restricted internal diameter.

C8. The radio frequency channel structure of C7, wherein the tubular portion includes an internal septum structure, and the iris structure, septum, and lattice stiffening structure are a unitary component.

C9. The radio frequency channel structure of C7 or C8, wherein the internal iris structure is configured to filter radio signals and the restricted internal diameter corresponds to a selected radio frequency band.

C10. The radio frequency channel structure of any of C0-C9, wherein the internal structure is configured for a selected polarization.

C11. The radio frequency channel structure of any of C0-C10, wherein the internal structure includes a septum structure and the selected polarization is circular.

C12. The radio frequency channel structure of any of C0-C11, wherein the internal structure includes a change in cross-sectional geometry configured to transform a radio signal waveform.

C13. The radio frequency channel structure of any of C0-C12, wherein the tubular portion forms part of a command horn antenna.

C14. The radio frequency channel structure of any of C0-C13, wherein the tubular portion forms part of a cup dipole antenna.

C15. The radio frequency channel structure of any of C0-C14, wherein the internal structure has a lateral dimension corresponding to a selected radio signal wavelength.

D0. A method of manufacturing an antenna, comprising:
printing a tubular structure configured to send or receive radio frequency signals.

D1. The method of D0, wherein the tubular structure has an outer circumferential side portion supported by a lattice array.

D2. The method of D1, wherein the lattice array includes diamond shaped openings.

D3. The method of any of D0-D2, wherein the tubular structure is connected to a base portion, the tubular structure flaring outward in a direction away from the base portion.

D4. The method of any of D0-D3, wherein the printing step includes;
depositing multiple layers of sintered metal alloy.

D5. The method of D4, wherein the alloy comprises aluminum.

D6. The method of any of D0-D5, wherein the printing step is carried out without using secondary supports.

D7. The method of any of D0-D6, wherein the printing step includes:
forming a command horn antenna.

D8. The method of any of D0-D6, wherein the printing step includes:
forming a cup dipole antenna.

D9. The method of any of D0-D8, further comprising:
printing an iris structure inside the tubular structure.

D10. The method of any of D0-D9, further comprising:
printing a base portion connected to the tubular structure.

D11. The method of D10, further comprising:
machining connector holes in the base portion.

D12. The method of D10 or D11, further comprising:
machining fastener holes in the base portion.

D13. The method of any of D10-D12, further comprising:
printing a choke structure connected to the tubular structure and distal to the base portion.

E0. A method of manufacturing a piece, comprising:
printing a three dimensional body portion in a vertical direction,
printing a flared middle section on top of the body portion, and
printing an overhanging section on top of the flared middle section.

E1. The method of E0, wherein the step of printing a flared middle section includes:
printing a stiffening lattice array on an external side of the middle section.

E2. The method of E1, wherein the lattice array includes diamond shaped openings.

E3. The method of E2, wherein the diamond shaped openings are oriented to avoid a need for secondary support.

E4. The method of any of E0-E3, wherein the middle section has a flare angle selected to avoid a need for secondary support.

E5. The method of any of E0-E4, wherein the middle section has an average flare angle of less than 50 degrees.

E6. The method of any of E0-E5, wherein the middle section has an average flare angle of less than 45 degrees.

E7. The method of any of E0-E6, wherein the middle section has an outwardly curved profile.

E8. The method of any of E0-E7, wherein an internal cavity of the flared middle section has a circular cross section.

Advantages, Features, Benefits

The different embodiments and examples of the additively manufactured antenna components described herein provide several advantages over known solutions for antenna design. For example, illustrative embodiments and examples described herein allow manufacture of an antenna with reduced manual assembly.

Additionally, and among other benefits, illustrative embodiments and examples described herein allow additive manufacture of circular apertures.

Additionally, and among other benefits, illustrative embodiments and examples described herein allow a highly geometrically precise antenna to be repeatably additively manufactured.

Additionally, and among other benefits, illustrative embodiments and examples described herein may have improved operational reliability.

No known system or device can perform these functions, particularly without need for secondary supports in the additive manufacturing process. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An antenna device comprising:
    an additively manufactured base portion,
    an additively manufactured tubular body portion attached to the base portion, the body portion including a lattice configured to eliminate secondary printing support, wherein the lattice flares outward to support a choke structure.

2. The antenna device of claim 1, wherein the base portion and body portion form a command horn antenna.

3. The antenna device of claim 1, wherein the base portion and body portion are comprised of laser sintered metal alloy.

4. The antenna device of claim 1, wherein the base portion and body portion are comprised of laser sintered aluminum alloy.

5. The antenna device of claim 1, wherein the lattice flares outward at an average angle of less than 50 degrees.

6. The antenna device of claim 1, wherein the lattice includes an array of diamond shaped openings.

7. The antenna device of claim 6, wherein a depth of each of the diamond shaped openings of the array of diamond shaped openings varies as the lattice flares outward.

8. The antenna device of claim 1, wherein the choke structure is configured to limit radio frequency output.

9. The antenna device of claim 1, wherein the choke includes a hollow cylinder and a circular base extending from the body portion.

10. The antenna device of claim 9, wherein the circular base extends perpendicularly from the body portion.

11. The antenna device of claim 1, wherein the choke has a double walled cup-shape.

12. The antenna device of claim 1, wherein the lattice has an increasing thickness as the lattice flares outward.

13. The antenna device of claim 1, wherein the tubular body portion has constant inner diameter as the lattice flares outward.

14. An antenna component, comprising:
    an elongate hollow body portion comprised of laser sintered alloy, configured to direct radio frequency signals, the body portion including a lattice on an outer circumferential side configured to avoid secondary printing support requirement, the lattice including openings,
    wherein the lattice flares outwardly upward toward an overhanging structure, and a depth of the openings of the lattice increases as the lattice flares outwardly upward.

15. The antenna component of claim 14, wherein the body portion forms part of a command horn antenna.

16. The antenna component of claim 14, wherein the openings of the lattice are diamond shaped.

17. The antenna component of claim 14, wherein the lattice is configured to maintain a circular shape of the body portion through an additive manufacturing procedure.

18. The antenna component of claim 14, wherein the overhanging structure is a choke.

19. The antenna component of claim 14, wherein the choke is configured to limit radio frequency output in a downward direction.

20. A method of manufacturing an antenna, comprising:
    printing a tubular structure configured to send or receive radio frequency signals, including depositing multiple layers of laser sintered metal alloy,
    wherein the tubular structure has an outer circumferential side portion surrounded by a lattice, the lattice flares out to support portion choke structure of the tubular structure, and the printing step is carried out without using secondary supports.

21. An antenna device, comprising:
an additively manufactured hollow body portion, and
an additively manufactured lattice structure including a plurality of intersecting linear structures extending from an outer circumferential surface of the hollow body portion,
wherein the lattice structure flares out to support a top portion choke structure connected to the hollow body portion.

22. The antenna device of claim 21, wherein a thickness of linear structures of the plurality of intersecting linear structures increases as the lattice structure flares out.

* * * * *